US011213773B2

(12) United States Patent
Okoro et al.

(10) Patent No.: US 11,213,773 B2
(45) Date of Patent: Jan. 4, 2022

(54) GENUINE FILTER RECOGNITION WITH FILTER MONITORING SYSTEM

(71) Applicant: Cummins Filtration IP, Inc., Columbus, IN (US)

(72) Inventors: Joseph O. Okoro, Columbus, IN (US); Bharadwaj R. Prabhala, Columbus, IN (US); Adaeze O. M. Okoye, Indianapolis, IN (US); Sonal Laxman Chirme, Pune (IN); Abhijit Shimpi, Hermitage, TN (US); Abhijeet Vaidya, Columbus, IN (US); Mahesh Suresh Chindarkar, Sangli (IN); Amit Shashikant Wankhede, Pune (IN); J. Stephen Wills, Columbus, IN (US); Barry M. Verdegan, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/490,818

(22) PCT Filed: Mar. 6, 2018

(86) PCT No.: PCT/US2018/021129
§ 371 (c)(1),
(2) Date: Sep. 3, 2019

(87) PCT Pub. No.: WO2018/165146
PCT Pub. Date: Sep. 13, 2018

(65) Prior Publication Data
US 2020/0009485 A1 Jan. 9, 2020

Related U.S. Application Data

(60) Provisional application No. 62/467,348, filed on Mar. 6, 2017.

(51) Int. Cl.
*B01D 35/143* (2006.01)
*F01M 1/10* (2006.01)
(Continued)

(52) U.S. Cl.
CPC ............. *B01D 35/143* (2013.01); *F01M 1/10* (2013.01); *F01M 11/10* (2013.01); *F16N 39/06* (2013.01);
(Continued)

(58) Field of Classification Search
CPC . F01M 1/10; F01M 1/18; F01M 11/03; F01M 11/10; F01M 13/04;
(Continued)

(56) References Cited

U.S. PATENT DOCUMENTS 5,629,981 A    5/1997 Nerlikar
5,995,898 A *  11/1999 Tuttle ................... G07B 15/063
                                                  427/255.31
(Continued)

FOREIGN PATENT DOCUMENTS

CN    101957905 A    1/2011
CN    105637209 A    6/2016
(Continued)

OTHER PUBLICATIONS

International Search Report and Written Opinion issued for PCT/US2018/021129, dated May 16, 2018, 9 pages.
(Continued)

*Primary Examiner* — John M Zaleskas
(74) *Attorney, Agent, or Firm* — Foley & Lardner LLP

(57) ABSTRACT

Systems and methods for determining whether an authorized or genuine filter element is installed in a filtration system are described. The authorized filter determination may be based on radio frequency identification ("RFID") technology. RFID readers with antennas in the monitored filter systems
(Continued)

read the RFID tag information from the installed filter elements and feed any detected information into the filter monitoring system. The filter monitoring system or a remote diagnostic system analyzes the returned data (or absence thereof) to determine if a genuine (i.e., authorized, OEM approved, etc.) filter element is installed or not.

18 Claims, 6 Drawing Sheets

(51) Int. Cl.
    *F01M 11/10*     (2006.01)
    *G01M 15/02*     (2006.01)
    *G06K 7/10*     (2006.01)
    *G06K 7/14*     (2006.01)
    *F16N 39/06*     (2006.01)
    *B01D 29/11*     (2006.01)
    *F02D 41/14*     (2006.01)
    *G07C 5/08*     (2006.01)

(52) U.S. Cl.
CPC ......... *G01M 15/02* (2013.01); *G06K 7/10366* (2013.01); *G06K 7/1413* (2013.01); *B01D 29/11* (2013.01); *B01D 2201/4046* (2013.01); *B01D 2201/52* (2013.01); *B01D 2201/56* (2013.01); *F02D 2041/1432* (2013.01); *G07C 5/085* (2013.01)

(58) Field of Classification Search
CPC ... F01M 2001/1007; F01M 2013/0438; F02M 35/0205; F02M 37/42; F02D 41/22; F16N 39/06; G01M 15/02; B01D 27/101; B01D 35/005; B01D 35/143; B01D 46/0086; B01D 46/429; B01D 2201/4046; B01D 2201/52; B01D 2201/56
See application file for complete search history.

(56) References Cited

U.S. PATENT DOCUMENTS

| | | |
|---|---|---|
| 6,130,623 A | 10/2000 | MacLellan et al. |
| 6,226,619 B1 | 5/2001 | Halperin et al. |
| 6,259,367 B1 | 7/2001 | Klein |
| 6,317,026 B1 * | 11/2001 | Brodine ............ B60R 25/00 340/5.8 |
| 6,354,493 B1 | 3/2002 | Mon |
| 6,429,776 B1 | 8/2002 | Alicot et al. |
| 6,442,276 B1 | 8/2002 | Doljack |
| 6,558,444 B1 * | 5/2003 | Hunter ............ B01D 46/003 55/385.1 |
| 6,738,903 B1 | 5/2004 | Haines |
| 6,750,769 B1 | 6/2004 | Smith |
| 6,816,075 B2 | 11/2004 | Grunes et al. |
| 6,840,445 B2 * | 1/2005 | Gatz ............ G06K 17/0029 235/385 |
| 6,898,489 B1 * | 5/2005 | Hayes, Sr. ............ G06K 17/00 340/5.2 |
| 6,925,471 B2 | 8/2005 | Bodin et al. |
| 6,933,848 B1 | 8/2005 | Stewart et al. |
| 6,967,577 B2 | 11/2005 | Taylor et al. |
| 6,992,574 B2 | 1/2006 | Aupperle et al. |
| 6,996,543 B1 | 2/2006 | Coppersmith et al. |
| 7,004,385 B1 | 2/2006 | Douglass |
| 7,036,729 B2 | 5/2006 | Chung |
| 7,040,532 B1 | 5/2006 | Taylor et al. |
| 7,042,346 B2 | 5/2006 | Paulsen |
| 7,047,103 B2 | 5/2006 | Hornbaker et al. |
| 7,066,388 B2 | 6/2006 | He |
| 7,086,587 B2 | 8/2006 | Myllymaki |
| 7,108,177 B2 | 9/2006 | Brookner |
| 7,151,445 B2 | 12/2006 | Medve et al. |
| 7,151,455 B2 | 12/2006 | Lindsay et al. |
| 7,158,035 B2 | 1/2007 | Sakamoto et al. |
| 7,162,328 B2 | 1/2007 | Hornbaker et al. |
| 7,164,354 B1 | 1/2007 | Panzer |
| 7,170,391 B2 | 1/2007 | Lane et al. |
| 7,173,515 B2 | 2/2007 | Ohki et al. |
| 7,173,528 B1 | 2/2007 | Stewart et al. |
| 7,176,797 B2 | 2/2007 | Zai et al. |
| 7,183,895 B2 | 2/2007 | Bazakos et al. |
| 7,183,924 B1 | 2/2007 | Ku |
| 7,187,267 B2 | 3/2007 | Cole |
| 7,187,286 B2 | 3/2007 | Morris et al. |
| 7,187,287 B2 | 3/2007 | Ryal |
| 7,199,714 B2 | 4/2007 | Sako et al. |
| 7,199,719 B2 | 4/2007 | Steinberg |
| 7,218,228 B2 | 5/2007 | Sakamoto et al. |
| 7,218,231 B2 | 5/2007 | Higham |
| 7,221,258 B2 | 5/2007 | Lane et al. |
| 7,221,278 B2 | 5/2007 | Chiu et al. |
| 7,222,791 B2 | 5/2007 | Heilper et al. |
| 7,224,277 B2 | 5/2007 | Kunito et al. |
| 7,227,468 B1 | 6/2007 | Florio |
| 7,239,226 B2 | 7/2007 | Berardi et al. |
| 7,239,229 B2 | 7/2007 | Bauhahn |
| 7,239,241 B2 | 7/2007 | Claudatos et al. |
| 7,245,221 B2 | 7/2007 | Claudatos et al. |
| 7,246,744 B2 | 7/2007 | O'Brien et al. |
| 7,267,286 B2 | 9/2007 | Choong et al. |
| 7,283,630 B1 | 10/2007 | Doljack |
| 7,284,692 B1 | 10/2007 | Douglass |
| 7,287,693 B2 | 10/2007 | Brookner |
| 7,295,114 B1 | 11/2007 | Drzaic et al. |
| 7,296,736 B2 | 11/2007 | Yamagiwa |
| 7,298,264 B1 | 11/2007 | Kuzma et al. |
| 7,298,268 B2 | 11/2007 | Zimmerman et al. |
| 7,307,533 B2 | 12/2007 | Ishii |
| 7,312,707 B1 | 12/2007 | Bishop et al. |
| 7,322,523 B2 | 1/2008 | Howarth et al. |
| 7,323,992 B2 | 1/2008 | Doan et al. |
| 7,325,734 B2 | 2/2008 | Howarth et al. |
| 7,327,260 B2 | 2/2008 | Himberger et al. |
| 7,330,118 B2 | 2/2008 | Durham et al. |
| 7,333,001 B2 | 2/2008 | Lane et al. |
| 7,336,175 B2 | 2/2008 | Howarth et al. |
| 7,345,576 B2 | 3/2008 | Allen et al. |
| 7,348,886 B2 | 3/2008 | Himberger et al. |
| 7,350,708 B2 | 4/2008 | Melick et al. |
| 7,355,514 B2 | 4/2008 | Medve et al. |
| 7,356,394 B2 | 4/2008 | Burgess |
| 7,362,210 B2 | 4/2008 | Bazakos et al. |
| 7,378,967 B2 | 5/2008 | Sullivan et al. |
| 7,382,261 B2 | 6/2008 | Lin et al. |
| 7,385,509 B2 | 6/2008 | Taylor et al. |
| 7,388,489 B2 | 6/2008 | Sagawa |
| 7,388,490 B2 | 6/2008 | Freitag et al. |
| 7,395,963 B2 | 7/2008 | Silverbrook et al. |
| 7,400,268 B2 * | 7/2008 | Wilbrink ............ G07C 5/085 340/438 |
| 7,400,989 B2 | 7/2008 | Chapman et al. |
| 7,405,657 B2 | 7/2008 | Chon et al. |
| 7,407,110 B2 | 8/2008 | Davis et al. |
| 7,411,500 B2 | 8/2008 | Hamerly et al. |
| 7,413,124 B2 | 8/2008 | Frank et al. |
| 7,417,546 B2 | 8/2008 | Llorca et al. |
| 7,432,797 B2 | 10/2008 | Hunt et al. |
| 7,432,811 B1 | 10/2008 | Kuzma et al. |
| 7,439,864 B2 | 10/2008 | Hunt et al. |
| 7,450,007 B2 | 11/2008 | Cook et al. |
| 7,450,010 B1 | 11/2008 | Gravelle et al. |
| 7,455,217 B2 | 11/2008 | Taylor et al. |
| 7,457,952 B2 | 11/2008 | Rogriguez et al. |
| 7,463,150 B2 | 12/2008 | Rajan |
| 7,464,879 B2 | 12/2008 | Silverbrook et al. |
| 7,466,232 B2 | 12/2008 | Neuwirth |
| 7,468,650 B2 | 12/2008 | Childress et al. |
| 7,474,211 B2 | 1/2009 | Kramer |
| 7,474,217 B2 | 1/2009 | Himberger et al. |
| 7,479,883 B2 | 1/2009 | Chiu |
| 7,486,171 B2 | 2/2009 | Kim et al. |

(56) References Cited

U.S. PATENT DOCUMENTS

| | | |
|---|---|---|
| 7,487,914 B2 | 2/2009 | Yoon et al. |
| 7,489,246 B2 | 2/2009 | Himberger et al. |
| 7,492,252 B2 | 2/2009 | Maruyama |
| 7,492,258 B1 | 2/2009 | Shoarinejad et al. |
| 7,498,943 B2 | 3/2009 | Medve et al. |
| 7,501,948 B2 | 3/2009 | Roemerman et al. |
| 7,504,929 B2 | 3/2009 | Oh et al. |
| 7,510,110 B2 | 3/2009 | Pietrzyk et al. |
| 7,511,618 B2 | 3/2009 | Hornbaker et al. |
| 7,513,425 B2 | 4/2009 | Chung |
| 7,513,431 B2 | 4/2009 | Chiu |
| 7,518,517 B2 | 4/2009 | Sako |
| 7,532,104 B2 | 5/2009 | Juels |
| 7,532,122 B2 | 5/2009 | Aull et al. |
| 7,535,361 B2 | 5/2009 | Doan et al. |
| 7,537,157 B2 | 5/2009 | Silverbrook et al. |
| 7,541,929 B2 | 6/2009 | Zimmerman et al. |
| 7,543,745 B1 | 6/2009 | Simske et al. |
| 7,551,086 B2 | 6/2009 | Coop et al. |
| 7,551,090 B2 | 6/2009 | Doan et al. |
| 7,554,449 B2 | 6/2009 | Higham |
| 7,570,164 B2 | 8/2009 | Chakraborty et al. |
| 7,570,165 B2 | 8/2009 | Abraham et al. |
| 7,571,863 B2 | 8/2009 | Lauper |
| 7,573,370 B2 | 8/2009 | Becker et al. |
| 7,576,651 B2 | 8/2009 | Jin et al. |
| 7,581,242 B1 | 8/2009 | Oget et al. |
| 7,584,885 B1 | 9/2009 | Douglass |
| 7,592,917 B2 | 9/2009 | Quan et al. |
| 7,602,288 B2 | 10/2009 | Broussard |
| 7,602,291 B2 | 10/2009 | Tseng et al. |
| 7,606,557 B2 | 10/2009 | Park et al. |
| 7,609,161 B2 | 10/2009 | Min et al. |
| 7,616,113 B2 | 11/2009 | Ayachitula et al. |
| 7,619,525 B2 | 11/2009 | Kwan |
| 7,633,392 B2 | 12/2009 | Neuwirth |
| 7,636,044 B1 | 12/2009 | Callaghan |
| 7,637,419 B2 | 12/2009 | Silverbrook et al. |
| 7,639,143 B2 | 12/2009 | Hughes et al. |
| 7,646,300 B2 | 1/2010 | Stewart et al. |
| 7,648,070 B2 | 1/2010 | Droms et al. |
| 7,658,319 B2 | 2/2010 | Howarth et al. |
| 7,658,325 B2 | 2/2010 | Lapstun et al. |
| 7,659,821 B2 | 2/2010 | Kim et al. |
| 7,663,487 B2 | 2/2010 | Morris et al. |
| 7,671,743 B2 | 3/2010 | Smith |
| 7,676,382 B2 | 3/2010 | Silverbrook et al. |
| 7,679,511 B2 | 3/2010 | Lauper |
| 7,698,179 B2 | 4/2010 | Leung et al. |
| 7,701,348 B2 | 4/2010 | Kim |
| 7,705,732 B2 | 4/2010 | Bishop et al. |
| 7,714,725 B2 | 5/2010 | Medve et al. |
| 7,719,423 B2 | 5/2010 | Himberger et al. |
| 7,728,731 B2 | 6/2010 | Kim |
| 7,735,725 B1 | 6/2010 | Bishop et al. |
| 7,737,824 B2 | 6/2010 | Aikawa et al. |
| 7,741,970 B2 | 6/2010 | Cunningham et al. |
| 7,750,793 B2 | 7/2010 | Juels |
| 7,752,137 B2 | 7/2010 | Dillon |
| 7,755,469 B2 | 7/2010 | Sung et al. |
| 7,760,094 B1 | 7/2010 | Kozischek et al. |
| 7,760,096 B2 | 7/2010 | Jin et al. |
| 7,761,347 B2 | 7/2010 | Fujisawa et al. |
| 7,772,964 B2 | 8/2010 | Tethrake et al. |
| 7,774,268 B2 | 8/2010 | Bradley |
| 7,786,866 B2 | 8/2010 | Berthold |
| 7,789,308 B2 | 9/2010 | Droms et al. |
| 7,789,314 B2 | 9/2010 | Karstens |
| 7,791,451 B2 | 9/2010 | Lei et al. |
| 7,793,854 B2 | 9/2010 | Lapstun et al. |
| 7,801,742 B2 | 9/2010 | Silverbrook et al. |
| 7,806,342 B2 | 10/2010 | Lapstun et al. |
| 7,810,726 B2 | 10/2010 | De La Huerga |
| 7,817,013 B2 | 10/2010 | Bazakos et al. |
| 7,817,045 B2 | 10/2010 | Onderko |
| 7,832,001 B2 | 11/2010 | Noble |
| 7,834,764 B2 | 11/2010 | Hunt et al. |
| 7,841,513 B1 | 11/2010 | Katzer et al. |
| 7,843,313 B2 | 11/2010 | Bazakos et al. |
| 7,847,694 B2 | 12/2010 | Lee et al. |
| 7,847,696 B2 | 12/2010 | Karjoth et al. |
| 7,855,645 B2 | 12/2010 | Rajan |
| 7,856,554 B2 | 12/2010 | Lapstun et al. |
| 7,868,739 B2 | 1/2011 | Jung |
| 7,868,761 B2 | 1/2011 | Grunwald et al. |
| 7,874,494 B2 | 1/2011 | Lapstun et al. |
| 7,879,111 B2 | 2/2011 | Hardacker et al. |
| 7,880,617 B2 | 2/2011 | Morris et al. |
| 7,889,082 B2 | 2/2011 | Bauchot et al. |
| 7,899,708 B2 | 3/2011 | Lapstun et al. |
| 7,900,819 B2 | 3/2011 | Silverbrook et al. |
| 7,900,832 B2 | 3/2011 | Lapstun et al. |
| 7,902,985 B2 | 3/2011 | Rice et al. |
| 7,905,401 B2 | 3/2011 | Silverbrook et al. |
| 7,911,346 B1 | 3/2011 | Claudatos et al. |
| 7,913,093 B2 | 3/2011 | Ishigaki et al. |
| 7,917,443 B2 | 3/2011 | Dillon |
| 7,920,050 B2 | 4/2011 | Juels et al. |
| 7,920,063 B2 | 4/2011 | Ulrich |
| 7,922,075 B2 | 4/2011 | Silverbrook et al. |
| 7,925,535 B2 | 4/2011 | Beenau et al. |
| 7,931,197 B2 | 4/2011 | Brandt et al. |
| 7,937,297 B2 | 5/2011 | Boland et al. |
| 7,940,179 B2 | 5/2011 | Burbridge et al. |
| 7,940,181 B2 | 5/2011 | Ramachandra |
| 7,940,182 B2 | 5/2011 | Lange et al. |
| 7,944,339 B2 | 5/2011 | Park |
| 7,946,477 B1 | 5/2011 | Ramachandran et al. |
| 7,946,487 B2 | 5/2011 | Silverbrook et al. |
| 7,952,466 B2 | 5/2011 | Kelley et al. |
| 7,952,480 B1 | 5/2011 | Kuzma et al. |
| 7,952,481 B2 | 5/2011 | Shoarinejad et al. |
| 7,954,697 B2 | 6/2011 | Deng |
| 7,961,097 B2 | 6/2011 | Porte et al. |
| 7,961,106 B2 | 6/2011 | Jung |
| 7,962,349 B2 | 6/2011 | Silverbrook et al. |
| 7,978,050 B2 | 7/2011 | Moshfeghi |
| 7,978,077 B2 | 7/2011 | Lee et al. |
| 7,980,467 B2 | 7/2011 | Silverbrook et al. |
| 7,986,237 B2 | 7/2011 | Jung |
| 7,991,871 B2 | 8/2011 | Son et al. |
| 7,992,776 B1 | 8/2011 | Ramachandran et al. |
| 7,992,778 B1 | 8/2011 | Ramachandran et al. |
| 7,996,319 B2 | 8/2011 | Dillon |
| 7,996,879 B1 | 8/2011 | Fang et al. |
| 7,997,486 B2 | 8/2011 | Ulrich et al. |
| 8,004,387 B2 | 8/2011 | Childress et al. |
| 8,006,914 B2 | 8/2011 | Lapstun et al. |
| 8,009,017 B2 | 8/2011 | Park et al. |
| 8,015,412 B2 | 9/2011 | Lapstun et al. |
| 8,022,832 B2 | 9/2011 | Vogt et al. |
| 8,028,891 B2 | 10/2011 | Harjani |
| 8,028,905 B2 | 10/2011 | Holberg |
| 8,037,294 B2 | 10/2011 | Nochta |
| 8,040,220 B2 | 10/2011 | Sakai et al. |
| 8,040,242 B2 | 10/2011 | Carmeli |
| 8,044,773 B2 | 10/2011 | Posamentier |
| 8,049,594 B1 | 11/2011 | Baranowski |
| 8,049,623 B2 | 11/2011 | Morris et al. |
| 8,058,973 B2 | 11/2011 | Zeng et al. |
| 8,060,758 B2 | 11/2011 | Kerschbaum et al. |
| 8,066,181 B2 | 11/2011 | Bishop et al. |
| 8,077,014 B2 | 12/2011 | Park |
| 8,077,038 B2 | 12/2011 | Harwell |
| 8,081,076 B2 | 12/2011 | Bauchot et al. |
| 8,081,079 B1 | 12/2011 | Camarota |
| 8,085,132 B2 | 12/2011 | Allen et al. |
| 8,085,149 B2 | 12/2011 | Shoarinejad et al. |
| 8,087,577 B2 | 1/2012 | Davies |
| 8,094,020 B2 | 1/2012 | Groth et al. |
| 8,094,022 B2 | 1/2012 | Goodman et al. |
| 8,106,776 B2 | 1/2012 | Bauchot et al. |
| 8,111,153 B2 | 2/2012 | Kim et al. |
| 8,111,163 B2 | 2/2012 | Utaka et al. |

(56) References Cited

U.S. PATENT DOCUMENTS

| | | |
|---|---|---|
| 8,111,431 B2 | 2/2012 | Silverbrook et al. |
| 8,112,626 B1 | 2/2012 | Adler et al. |
| 8,117,455 B2 | 2/2012 | Silverbrook et al. |
| 8,125,317 B2 | 2/2012 | Yoon et al. |
| 8,125,339 B2 | 2/2012 | Neuwirth |
| 8,130,083 B2 | 3/2012 | Dorney |
| 8,134,452 B2 | 3/2012 | Tuttle |
| 8,134,466 B2 | 3/2012 | Jeon et al. |
| 8,138,922 B2 | 3/2012 | Lindsay et al. |
| 8,138,923 B2 | 3/2012 | Grunwald et al. |
| 8,143,995 B2 | 3/2012 | Soppera et al. |
| 8,146,802 B1 | 4/2012 | Ramachandran et al. |
| 8,146,803 B1 | 4/2012 | Ramachandran et al. |
| 8,152,053 B2 | 4/2012 | Pietrzyk et al. |
| 8,152,072 B2 | 4/2012 | Silverbrook et al. |
| 8,154,405 B2 | 4/2012 | Gravelle et al. |
| 8,159,329 B1 | 4/2012 | Killian et al. |
| 8,159,349 B2 | 4/2012 | Mcallister et al. |
| 8,164,459 B2 | 4/2012 | Rice et al. |
| 8,171,289 B2 | 5/2012 | Adler et al. |
| 8,174,369 B2 | 5/2012 | Jones et al. |
| 8,176,323 B2 | 5/2012 | Anemikos et al. |
| 8,179,265 B2 | 5/2012 | Elizondo et al. |
| 8,185,744 B2 | 5/2012 | Brown et al. |
| 8,191,767 B1 | 6/2012 | Ramachandran et al. |
| 8,207,820 B2 | 6/2012 | Bauchot et al. |
| 8,212,651 B2 | 7/2012 | Bauchot et al. |
| 8,214,651 B2 | 7/2012 | Anemikos et al. |
| 8,224,852 B2 | 7/2012 | Falk et al. |
| 8,232,862 B2 | 7/2012 | Lowe |
| 8,242,892 B2 | 8/2012 | Griffin |
| 8,242,907 B2 | 8/2012 | Butler et al. |
| 8,242,908 B2 | 8/2012 | Butler et al. |
| 8,242,911 B2 | 8/2012 | Moore et al. |
| 8,245,913 B1 | 8/2012 | Ramachandran et al. |
| 8,245,914 B1 | 8/2012 | Ramachandran et al. |
| 8,245,915 B1 | 8/2012 | Ramachandran et al. |
| 8,248,238 B2 | 8/2012 | Butler et al. |
| 8,248,239 B2 | 8/2012 | Butler et al. |
| 8,248,254 B2 | 8/2012 | Vogt et al. |
| 8,250,377 B2 | 8/2012 | Png et al. |
| 8,253,543 B2 | 8/2012 | Yamamoto |
| 8,253,567 B2 | 8/2012 | Butler et al. |
| 8,258,953 B2 | 9/2012 | Stern et al. |
| 8,258,956 B1 | 9/2012 | Kuzma et al. |
| 8,264,321 B2 | 9/2012 | Baranowski |
| 8,264,354 B2 | 9/2012 | Groth et al. |
| 8,264,355 B2 | 9/2012 | Kozischek et al. |
| 8,265,282 B2 | 9/2012 | Alessio et al. |
| 8,269,606 B2 | 9/2012 | Cardwell et al. |
| 8,269,630 B2 | 9/2012 | Butler et al. |
| 8,279,065 B2 | 10/2012 | Butler et al. |
| 8,280,817 B2 | 10/2012 | Dillon |
| 8,284,031 B2 | 10/2012 | Moshfeghi |
| 8,284,055 B2 | 10/2012 | Butler et al. |
| 8,284,056 B2 | 10/2012 | Mctigue |
| 8,284,061 B1 | 10/2012 | Dione |
| 8,284,939 B2 | 10/2012 | Tahan |
| 8,285,561 B2 | 10/2012 | Silverbrook et al. |
| 8,286,222 B2 | 10/2012 | Silverbrook et al. |
| 8,292,178 B2 | 10/2012 | Chaves |
| 8,294,579 B2 | 10/2012 | Butler et al. |
| 8,305,218 B2 | 11/2012 | Hunt et al. |
| 8,314,703 B2 | 11/2012 | Lee et al. |
| 8,317,098 B2 | 11/2012 | Roth et al. |
| 8,325,011 B2 | 12/2012 | Butler et al. |
| 8,325,043 B2 | 12/2012 | Shoarinejad |
| 8,325,044 B2 | 12/2012 | Martinez de Velasco Cortina et al. |
| 8,332,656 B2 | 12/2012 | Jones et al. |
| 8,334,757 B2 | 12/2012 | Guajardo Merchan et al. |
| 8,334,775 B2 | 12/2012 | Tapp et al. |
| 8,341,752 B2 | 12/2012 | Naressi et al. |
| 8,344,853 B1 | 1/2013 | Warner et al. |
| 8,347,097 B2 | 1/2013 | Lapstun et al. |
| 8,359,480 B2 | 1/2013 | Poovendran et al. |
| 8,360,315 B2 | 1/2013 | Szu |
| 8,362,877 B2 | 1/2013 | Bauchot et al. |
| 8,362,902 B2 | 1/2013 | Jun et al. |
| 8,368,541 B2 | 2/2013 | Moore et al. |
| 8,373,540 B2 | 2/2013 | Solomon |
| 8,376,221 B1 | 2/2013 | Ramachandran et al. |
| 8,378,786 B2 | 2/2013 | Bailey |
| 8,384,519 B2 | 2/2013 | Kuhl et al. |
| 8,384,546 B2 | 2/2013 | Foley et al. |
| 8,386,794 B2 | 2/2013 | Kang et al. |
| 8,387,889 B2 | 3/2013 | Lapstun et al. |
| 8,390,431 B1 | 3/2013 | Diorio |
| 8,390,456 B2 | 3/2013 | Puleston et al. |
| 8,400,275 B2 | 3/2013 | Huang |
| 8,400,304 B2 | 3/2013 | Morris et al. |
| 8,403,207 B2 | 3/2013 | Silverbrook et al. |
| 8,405,518 B2 | 3/2013 | Corwin |
| 8,416,057 B2 | 4/2013 | Bauchot et al. |
| 8,421,593 B2 | 4/2013 | Brandin |
| 8,421,630 B2 | 4/2013 | Butler et al. |
| 8,441,338 B2 | 5/2013 | Naressi et al. |
| 8,447,038 B2 | 5/2013 | Bauchot et al. |
| 8,471,706 B2 | 6/2013 | Schuster et al. |
| 8,477,033 B2 | 7/2013 | Claudatos et al. |
| 8,497,776 B2 | 7/2013 | Stern |
| 8,502,676 B2 | 8/2013 | Camarota |
| 8,542,098 B2 | 9/2013 | Killian et al. |
| 8,542,871 B2 | 9/2013 | Voloshynovskiy et al. |
| 8,543,411 B2 | 9/2013 | Koster |
| 8,547,202 B2 | 10/2013 | Huang |
| 8,550,336 B2 | 10/2013 | Wang et al. |
| 8,558,699 B2 | 10/2013 | Butler et al. |
| 8,564,416 B2 | 10/2013 | Steven et al. |
| 8,564,452 B2 | 10/2013 | Schaible et al. |
| 8,570,159 B2 | 10/2013 | Bhadriraju et al. |
| 8,581,729 B2 | 11/2013 | Rice et al. |
| 8,587,410 B2 | 11/2013 | Potyrailo et al. |
| 8,587,411 B1 | 11/2013 | Diorio |
| 8,587,436 B2 | 11/2013 | Martinez De Velasco Cortina et al. |
| 8,590,799 B2 | 11/2013 | Liu |
| 8,601,563 B2 | 12/2013 | Sakai et al. |
| 8,610,539 B2 | 12/2013 | Solomon |
| 8,613,107 B2 | 12/2013 | Peckover |
| 8,621,602 B2 | 12/2013 | Rijnswou Van et al. |
| 8,635,459 B2 | 1/2014 | Lyons et al. |
| 8,639,543 B2 | 1/2014 | Boss et al. |
| 8,653,940 B2 | 2/2014 | Nyffeler et al. |
| 8,659,389 B2 | 2/2014 | Nasser |
| 8,659,393 B2 | 2/2014 | Melendez et al. |
| 8,659,397 B2 | 2/2014 | Vargo et al. |
| 8,665,071 B2 | 3/2014 | Morris et al. |
| 8,669,848 B2 | 3/2014 | Morris et al. |
| 8,669,873 B2 | 3/2014 | Joseph |
| 8,673,137 B2 | 3/2014 | Verdegan et al. |
| 8,674,811 B2 | 3/2014 | Huang |
| 8,681,987 B2 | 3/2014 | Fairbanks et al. |
| 8,698,595 B2 | 4/2014 | Baranowski |
| 8,698,603 B2 | 4/2014 | Jett et al. |
| 8,710,952 B2 | 4/2014 | Tsudik et al. |
| 8,712,053 B2 | 4/2014 | Lei et al. |
| 8,718,669 B2 | 5/2014 | Lewis et al. |
| 8,723,645 B2 | 5/2014 | Ayyagari et al. |
| 8,723,648 B2 | 5/2014 | Attew |
| 8,726,021 B2 | 5/2014 | Poovendran et al. |
| 8,730,013 B2 | 5/2014 | Chen |
| 8,730,015 B2 | 5/2014 | Graf Von Reischach et al. |
| 8,736,424 B2 | 5/2014 | Shoarinejad et al. |
| 8,745,370 B2 | 6/2014 | Chaves et al. |
| 8,751,806 B1 | 6/2014 | Adler et al. |
| 8,754,751 B1 | 6/2014 | Picolli |
| 8,766,773 B2 | 7/2014 | Kennedy et al. |
| 8,766,778 B2 | 7/2014 | Brown |
| 8,781,927 B2 | 7/2014 | Killian et al. |
| 8,786,407 B2 | 7/2014 | Liu et al. |
| 8,789,746 B2 | 7/2014 | Toofan et al. |
| 8,791,794 B2 | 7/2014 | Soppera et al. |
| 8,791,822 B2 | 7/2014 | Delia et al. |

(56) References Cited

U.S. PATENT DOCUMENTS

| | | |
|---|---|---|
| 8,823,496 B2 | 9/2014 | Kuhl et al. |
| 8,842,831 B2 | 9/2014 | Braun |
| 8,847,761 B1 | 9/2014 | Claudatos et al. |
| 8,866,594 B1 * | 10/2014 | Diorio ............... G06K 7/10297 340/10.42 |
| 8,878,650 B2 | 11/2014 | Shin et al. |
| 8,878,651 B2 | 11/2014 | Kwak |
| 8,893,969 B2 | 11/2014 | Brandl |
| 8,896,419 B2 | 11/2014 | Schattleitner et al. |
| 8,896,420 B2 | 11/2014 | Chang et al. |
| 8,896,425 B1 | 11/2014 | Martin |
| 8,908,866 B2 | 12/2014 | Adler et al. |
| 8,917,159 B2 | 12/2014 | Mcallister et al. |
| 8,917,165 B2 | 12/2014 | Marques et al. |
| 8,929,553 B2 | 1/2015 | Bauchot et al. |
| 8,931,688 B2 | 1/2015 | Eldefrawy et al. |
| 8,931,689 B2 | 1/2015 | Wang et al. |
| 8,933,780 B2 | 1/2015 | Falk et al. |
| 8,933,791 B2 | 1/2015 | Vargo et al. |
| 8,938,615 B2 | 1/2015 | Neill et al. |
| 8,941,469 B1 | 1/2015 | Diorio et al. |
| 8,941,470 B2 | 1/2015 | Butler et al. |
| 8,947,214 B2 | 2/2015 | Solomon |
| 8,947,233 B2 | 2/2015 | Butler et al. |
| 8,947,235 B2 | 2/2015 | Joseph |
| 8,952,786 B1 | 2/2015 | Steege et al. |
| 8,952,790 B2 | 2/2015 | Kim et al. |
| 8,953,570 B2 | 2/2015 | Lin et al. |
| 8,963,684 B2 | 2/2015 | Nyffeler et al. |
| 8,964,986 B2 | 2/2015 | Tahan et al. |
| 8,967,457 B2 | 3/2015 | Shin et al. |
| 8,977,234 B2 | 3/2015 | Chava |
| 8,981,955 B2 | 3/2015 | Schaible et al. |
| 8,988,200 B2 | 3/2015 | Lee et al. |
| 8,988,223 B2 | 3/2015 | Puleston et al. |
| 8,989,387 B2 | 3/2015 | Bauchot et al. |
| 8,994,501 B2 | 3/2015 | O'Haire |
| 8,994,514 B1 | 3/2015 | Juels et al. |
| 9,000,893 B2 | 4/2015 | Kwak |
| 9,007,182 B2 | 4/2015 | Cruzado et al. |
| 9,007,212 B2 | 4/2015 | Amador et al. |
| 9,007,214 B2 | 4/2015 | Joseph |
| 9,013,266 B2 | 4/2015 | Griffiths-Harvey et al. |
| 9,019,079 B2 | 4/2015 | Morris et al. |
| 9,024,723 B2 | 5/2015 | Broos et al. |
| 9,024,729 B1 | 5/2015 | Diorio et al. |
| 9,033,221 B1 | 5/2015 | Ramachandran et al. |
| 9,042,281 B2 | 5/2015 | Miller et al. |
| 9,043,241 B1 | 5/2015 | Lyon et al. |
| 9,047,499 B2 | 6/2015 | Nordin et al. |
| 9,054,881 B2 | 6/2015 | Lee et al. |
| 9,064,164 B2 | 6/2015 | Jett et al. |
| 9,076,024 B2 | 7/2015 | Corby |
| 9,076,119 B2 | 7/2015 | Jain et al. |
| 9,087,246 B1 | 7/2015 | Chin et al. |
| 9,092,679 B2 | 7/2015 | Jones et al. |
| 9,104,926 B2 | 8/2015 | Shoarinejad et al. |
| 9,104,927 B2 | 8/2015 | Amador et al. |
| 9,111,283 B1 | 8/2015 | Diorio et al. |
| 9,112,941 B2 | 8/2015 | Weidinger et al. |
| 9,117,128 B2 | 8/2015 | Mats et al. |
| 9,117,154 B2 | 8/2015 | Enyedy |
| 9,123,067 B2 | 9/2015 | Deyle et al. |
| 9,124,565 B2 | 9/2015 | Soppera et al. |
| 9,129,165 B2 | 9/2015 | Sugano et al. |
| 9,129,168 B1 | 9/2015 | Diorio et al. |
| 9,129,169 B1 | 9/2015 | Diorio et al. |
| 9,135,669 B2 | 9/2015 | Roemerman et al. |
| 9,158,947 B2 | 10/2015 | Moshfeghi |
| 9,165,277 B2 | 10/2015 | Jones et al. |
| 9,177,186 B1 | 11/2015 | Rinehart et al. |
| 9,183,419 B2 | 11/2015 | Ung et al. |
| 9,208,293 B1 | 12/2015 | Zhu |
| 9,208,360 B2 | 12/2015 | Park et al. |
| 9,213,870 B1 | 12/2015 | Diorio et al. |
| 9,213,871 B1 | 12/2015 | Diorio et al. |
| 9,213,971 B2 | 12/2015 | Lee et al. |
| 9,218,515 B2 | 12/2015 | Niedermeyer et al. |
| 9,218,560 B2 | 12/2015 | Chen |
| 9,230,274 B2 | 1/2016 | Dennard et al. |
| 9,231,947 B2 | 1/2016 | Fairbanks et al. |
| 9,256,844 B2 | 2/2016 | Killian et al. |
| 9,256,881 B2 | 2/2016 | Engels et al. |
| 9,262,655 B2 | 2/2016 | Baranowski |
| 9,264,231 B2 | 2/2016 | Dean |
| 9,274,020 B2 | 3/2016 | Chernov et al. |
| 9,275,530 B1 | 3/2016 | Perry |
| 9,277,406 B2 | 3/2016 | Hinz et al. |
| 9,305,283 B1 | 4/2016 | Lauka et al. |
| 9,306,637 B2 | 4/2016 | Kuhl et al. |
| 9,311,665 B2 | 4/2016 | Mercado et al. |
| 9,319,756 B2 | 4/2016 | Zimmerman et al. |
| 9,324,079 B2 | 4/2016 | Moulin et al. |
| 9,328,537 B2 | 5/2016 | Joseph |
| 9,334,150 B1 | 5/2016 | Ost et al. |
| 9,334,820 B2 | 5/2016 | Komine et al. |
| 9,349,027 B2 | 5/2016 | Szu |
| 9,361,568 B2 | 6/2016 | Butler et al. |
| 9,368,000 B2 | 6/2016 | Ramachandran et al. |
| 9,369,287 B1 | 6/2016 | Sarvestani |
| 9,373,008 B2 | 6/2016 | Nyffeler et al. |
| 9,373,011 B2 | 6/2016 | Ahmadloo |
| 9,390,362 B2 | 7/2016 | Butler et al. |
| 9,405,945 B1 | 8/2016 | Diorio et al. |
| 9,405,950 B2 | 8/2016 | Mats et al. |
| 9,418,263 B2 | 8/2016 | Butler et al. |
| 9,424,447 B2 | 8/2016 | Puleston et al. |
| 9,522,353 B2 | 12/2016 | Richardson |
| 2004/0011713 A1 * | 1/2004 | Ushioda ............ B01D 46/0086 210/85 |
| 2004/0238420 A1 * | 12/2004 | Oldendorf ........... B01D 35/143 210/91 |
| 2005/0035852 A1 * | 2/2005 | Paulsen ................. G07C 5/085 340/438 |
| 2005/0115877 A1 * | 6/2005 | Underwood ............ C02F 1/008 210/143 |
| 2006/0060512 A1 * | 3/2006 | Astle .................... B01D 29/606 210/85 |
| 2006/0098993 A1 * | 5/2006 | Yang ................. G03G 15/0855 399/12 |
| 2006/0140647 A1 * | 6/2006 | Adkins ............. G03G 15/0865 399/12 |
| 2006/0157391 A1 * | 7/2006 | Astle .................... B01D 29/606 210/85 |
| 2007/0008121 A1 | 1/2007 | Hart |
| 2007/0013522 A1 | 1/2007 | Chiu |
| 2007/0016942 A1 | 1/2007 | Sakai et al. |
| 2007/0017985 A1 | 1/2007 | Lapstun et al. |
| 2007/0017987 A1 | 1/2007 | Lapstun et al. |
| 2007/0017991 A1 | 1/2007 | Lapstun et al. |
| 2007/0018002 A1 | 1/2007 | Lapstun et al. |
| 2007/0018828 A1 | 1/2007 | Stewart et al. |
| 2007/0022045 A1 | 1/2007 | Lapstun et al. |
| 2007/0022294 A1 | 1/2007 | Lapstun et al. |
| 2007/0023516 A1 | 2/2007 | Chapman et al. |
| 2007/0034686 A1 | 2/2007 | Davis et al. |
| 2007/0040654 A1 | 2/2007 | Lee et al. |
| 2007/0040671 A1 | 2/2007 | Medve et al. |
| 2007/0040693 A1 | 2/2007 | Medve et al. |
| 2007/0046431 A1 | 3/2007 | Chakraborty et al. |
| 2007/0046439 A1 | 3/2007 | Takaku et al. |
| 2007/0046467 A1 | 3/2007 | Chakraborty et al. |
| 2007/0052523 A1 | 3/2007 | Jin et al. |
| 2007/0052525 A1 | 3/2007 | Quan et al. |
| 2007/0055470 A1 | 3/2007 | Pietrzyk et al. |
| 2007/0057768 A1 | 3/2007 | Zeng et al. |
| 2007/0057791 A1 | 3/2007 | Karjoth et al. |
| 2007/0063029 A1 | 3/2007 | Brandt et al. |
| 2007/0069851 A1 | 3/2007 | Sung et al. |
| 2007/0069852 A1 | 3/2007 | Mo et al. |
| 2007/0075861 A1 | 4/2007 | Cook et al. |
| 2007/0081671 A1 | 4/2007 | Ross et al. |
| 2007/0096883 A1 | 5/2007 | Kim |

(56) References Cited

U.S. PATENT DOCUMENTS

| | | |
|---|---|---|
| 2007/0096912 A1 | 5/2007 | Rajan |
| 2007/0100677 A1 | 5/2007 | Boss et al. |
| 2007/0100761 A1 | 5/2007 | Dillon |
| 2007/0103274 A1 | 5/2007 | Berthold |
| 2007/0106892 A1 | 5/2007 | Engberg |
| 2007/0106897 A1 | 5/2007 | Kulakowski |
| 2007/0108285 A1 | 5/2007 | Lapstun et al. |
| 2007/0109103 A1 | 5/2007 | Jedrey et al. |
| 2007/0109124 A1 | 5/2007 | Park et al. |
| 2007/0114280 A1 | 5/2007 | Coop et al. |
| 2007/0120651 A1 | 5/2007 | Kobayashi et al. |
| 2007/0126578 A1 | 6/2007 | Broussard |
| 2007/0132549 A1 | 6/2007 | Ichikawa et al. |
| 2007/0132585 A1 | 6/2007 | Llorca et al. |
| 2007/0133807 A1 | 6/2007 | Lee et al. |
| 2007/0143162 A1 | 6/2007 | Keever et al. |
| 2007/0146141 A1 | 6/2007 | Popplewell et al. |
| 2007/0156281 A1 | 7/2007 | Leung et al. |
| 2007/0159330 A1 | 7/2007 | Chakraborty et al. |
| 2007/0159338 A1 | 7/2007 | Beber et al. |
| 2007/0164863 A1 | 7/2007 | Himberger et al. |
| 2007/0165861 A1 | 7/2007 | Kuhl et al. |
| 2007/0174196 A1 | 7/2007 | Becker et al. |
| 2007/0176744 A1 | 8/2007 | Park et al. |
| 2007/0188306 A1 | 8/2007 | Tethrake et al. |
| 2007/0194879 A1 | 8/2007 | Backes et al. |
| 2007/0194889 A1 | 8/2007 | Bailey et al. |
| 2007/0194930 A1 | 8/2007 | Hunt et al. |
| 2007/0199988 A1 | 8/2007 | Labgold et al. |
| 2007/0200686 A1 | 8/2007 | Jung |
| 2007/0204329 A1 | 8/2007 | Peckover |
| 2007/0206786 A1 | 9/2007 | Chakraborty |
| 2007/0206797 A1 | 9/2007 | Chan et al. |
| 2007/0210923 A1 | 9/2007 | Butler et al. |
| 2007/0222609 A1* | 9/2007 | Duron .................. G06K 7/0008 340/572.7 |
| 2007/0234058 A1 | 10/2007 | White |
| 2007/0236338 A1 | 10/2007 | Maruyama |
| 2007/0241196 A1 | 10/2007 | Yoon et al. |
| 2007/0241905 A1 | 10/2007 | Himberger et al. |
| 2007/0262849 A1 | 11/2007 | Ismail |
| 2007/0273512 A1 | 11/2007 | Sako et al. |
| 2007/0285206 A1 | 12/2007 | Zimmerman et al. |
| 2007/0285242 A1 | 12/2007 | Higham |
| 2007/0290803 A1 | 12/2007 | Ayyagari et al. |
| 2007/0290815 A1 | 12/2007 | Delis |
| 2008/0001748 A1 | 1/2008 | Childress et al. |
| 2008/0001752 A1 | 1/2008 | Bruns et al. |
| 2008/0002882 A1 | 1/2008 | Voloshynovskyy et al. |
| 2008/0011847 A1 | 1/2008 | Silverbrook et al. |
| 2008/0011849 A1 | 1/2008 | Silverbrook et al. |
| 2008/0013124 A1 | 1/2008 | Silverbrook et al. |
| 2008/0017710 A1 | 1/2008 | Silverbrook et al. |
| 2008/0024268 A1 | 1/2008 | Wong et al. |
| 2008/0046263 A1 | 2/2008 | Sager et al. |
| 2008/0055085 A1 | 3/2008 | Samboursky et al. |
| 2008/0060983 A1* | 3/2008 | Kleber ................ B01D 35/143 210/85 |
| 2008/0061935 A1 | 3/2008 | Melendez et al. |
| 2008/0061936 A1 | 3/2008 | Park |
| 2008/0061982 A1 | 3/2008 | Himberger et al. |
| 2008/0069347 A1 | 3/2008 | Brown et al. |
| 2008/0071421 A1 | 3/2008 | Silverbrook et al. |
| 2008/0074263 A1 | 3/2008 | Rofougaran |
| 2008/0078826 A1 | 4/2008 | Siebers et al. |
| 2008/0079535 A1 | 4/2008 | Tseng et al. |
| 2008/0079540 A1 | 4/2008 | Aull et al. |
| 2008/0079578 A1 | 4/2008 | Kim et al. |
| 2008/0088450 A1 | 4/2008 | Kwan |
| 2008/0093448 A1 | 4/2008 | De La Huerga |
| 2008/0094215 A1 | 4/2008 | Amador et al. |
| 2008/0094219 A1 | 4/2008 | Guenster et al. |
| 2008/0094220 A1 | 4/2008 | Foley et al. |
| 2008/0100442 A1 | 5/2008 | Grunwald et al. |
| 2008/0100443 A1 | 5/2008 | Grunwald et al. |
| 2008/0106385 A1 | 5/2008 | Kelley et al. |
| 2008/0106386 A1 | 5/2008 | Li et al. |
| 2008/0109654 A1 | 5/2008 | Hardacker et al. |
| 2008/0109899 A1 | 5/2008 | Rijnswou Van et al. |
| 2008/0120119 A1 | 5/2008 | Lee |
| 2008/0128492 A1 | 6/2008 | Roth et al. |
| 2008/0129447 A1 | 6/2008 | Choi et al. |
| 2008/0143476 A1 | 6/2008 | Kwok et al. |
| 2008/0143519 A1 | 6/2008 | Piotrowski |
| 2008/0150702 A1 | 6/2008 | Neill et al. |
| 2008/0157927 A1 | 7/2008 | Soppera et al. |
| 2008/0157928 A1 | 7/2008 | Butler et al. |
| 2008/0157968 A1 | 7/2008 | Cunningham et al. |
| 2008/0164975 A1 | 7/2008 | Butler et al. |
| 2008/0164976 A1 | 7/2008 | Griffiths-Harvey et al. |
| 2008/0164977 A1 | 7/2008 | Butler et al. |
| 2008/0170695 A1 | 7/2008 | Adler et al. |
| 2008/0175390 A1 | 7/2008 | Alessio et al. |
| 2008/0177665 A1 | 7/2008 | Noordam |
| 2008/0179390 A1 | 7/2008 | Harjani |
| 2008/0180249 A1 | 7/2008 | Butler et al. |
| 2008/0181398 A1 | 7/2008 | Pappu |
| 2008/0183722 A1 | 7/2008 | Lane et al. |
| 2008/0186137 A1 | 8/2008 | Butler et al. |
| 2008/0186138 A1 | 8/2008 | Butler et al. |
| 2008/0186139 A1 | 8/2008 | Butler et al. |
| 2008/0186180 A1 | 8/2008 | Butler et al. |
| 2008/0191844 A1 | 8/2008 | Allen et al. |
| 2008/0191878 A1 | 8/2008 | Abraham |
| 2008/0191882 A1 | 8/2008 | Zhou et al. |
| 2008/0197969 A1 | 8/2008 | Vogt et al. |
| 2008/0198011 A1 | 8/2008 | Leper |
| 2008/0201094 A1 | 8/2008 | Vogt et al. |
| 2008/0208753 A1 | 8/2008 | Lee et al. |
| 2008/0209511 A1 | 8/2008 | Silverbrook et al. |
| 2008/0209512 A1 | 8/2008 | Silverbrook et al. |
| 2008/0211630 A1 | 9/2008 | Butler et al. |
| 2008/0211673 A1 | 9/2008 | Himberger et al. |
| 2008/0214312 A1 | 9/2008 | Richard |
| 2008/0218316 A1 | 9/2008 | Marques et al. |
| 2008/0218354 A1 | 9/2008 | Lorentz et al. |
| 2008/0244714 A1 | 10/2008 | Kulakowski et al. |
| 2008/0252459 A1 | 10/2008 | Butler et al. |
| 2008/0270306 A1 | 10/2008 | Blencowe |
| 2008/0280560 A1 | 11/2008 | Tuttle |
| 2008/0284600 A1 | 11/2008 | Drzaic et al. |
| 2008/0290994 A1 | 11/2008 | Bruns et al. |
| 2008/0297326 A1 | 12/2008 | Chakraborty et al. |
| 2008/0297354 A1 | 12/2008 | Foley et al. |
| 2008/0301307 A1 | 12/2008 | Son et al. |
| 2008/0302867 A1 | 12/2008 | Holberg |
| 2008/0303635 A1 | 12/2008 | Jung |
| 2008/0309497 A1 | 12/2008 | Bryant |
| 2008/0316001 A1 | 12/2008 | Karjoth et al. |
| 2009/0002128 A1 | 1/2009 | Jung |
| 2009/0009285 A1 | 1/2009 | Corry et al. |
| 2009/0015385 A1 | 1/2009 | Teuwen et al. |
| 2009/0019946 A1* | 1/2009 | Mossman ................ B67D 7/06 73/861.42 |
| 2009/0021343 A1 | 1/2009 | Sinha |
| 2009/0032583 A1 | 2/2009 | Lapstun et al. |
| 2009/0044012 A1 | 2/2009 | Bishop et al. |
| 2009/0045911 A1 | 2/2009 | Bauchot et al. |
| 2009/0045956 A1 | 2/2009 | Rajan |
| 2009/0051485 A1 | 2/2009 | Corry et al. |
| 2009/0051490 A1 | 2/2009 | Childress et al. |
| 2009/0051501 A1 | 2/2009 | Tuttle |
| 2009/0058648 A1 | 3/2009 | Tuttle |
| 2009/0065580 A1 | 3/2009 | Davies |
| 2009/0072946 A1 | 3/2009 | Von Reischach et al. |
| 2009/0077385 A1 | 3/2009 | Silverbrook et al. |
| 2009/0084859 A1 | 4/2009 | Lapstun et al. |
| 2009/0084862 A1 | 4/2009 | McCallum |
| 2009/0085724 A1 | 4/2009 | Naressi et al. |
| 2009/0091790 A1 | 4/2009 | Silverbrook et al. |
| 2009/0096574 A1 | 4/2009 | Oberle |
| 2009/0096584 A1 | 4/2009 | Gravelle et al. |
| 2009/0096588 A1 | 4/2009 | Mynhardt |
| 2009/0097846 A1 | 4/2009 | Kozischek et al. |

(56) References Cited

U.S. PATENT DOCUMENTS

| | | |
|---|---|---|
| 2009/0106042 A1 | 4/2009 | Maytal et al. |
| 2009/0115573 A1 | 5/2009 | Naressi et al. |
| 2009/0121875 A1 | 5/2009 | Medve et al. |
| 2009/0122986 A1 | 5/2009 | Tahan et al. |
| 2009/0125723 A1 | 5/2009 | Lapstun et al. |
| 2009/0125724 A1 | 5/2009 | Lapstun et al. |
| 2009/0138275 A1 | 5/2009 | Maytal |
| 2009/0146812 A1 | 6/2009 | Rice et al. |
| 2009/0160605 A1 | 6/2009 | Roemerman et al. |
| 2009/0167489 A1 | 7/2009 | Nan et al. |
| 2009/0169019 A1 | 7/2009 | Bauchot et al. |
| 2009/0184802 A1 | 7/2009 | Park |
| 2009/0184826 A1 | 7/2009 | Kim |
| 2009/0184838 A1 | 7/2009 | Jeon et al. |
| 2009/0201129 A1 | 8/2009 | Lane et al. |
| 2009/0201131 A1 | 8/2009 | Delia et al. |
| 2009/0201133 A1 | 8/2009 | Bruns |
| 2009/0204417 A1 | 8/2009 | Tsuria |
| 2009/0208012 A1 | 8/2009 | Chou |
| 2009/0219132 A1 | 9/2009 | Maytal et al. |
| 2009/0222285 A1 | 9/2009 | Silverbrook et al. |
| 2009/0224892 A1 | 9/2009 | Nicholls |
| 2009/0231138 A1 | 9/2009 | Lai et al. |
| 2009/0243814 A1 | 10/2009 | Yamamoto |
| 2009/0254755 A1 | 10/2009 | Silverbrook et al. |
| 2009/0256679 A1 | 10/2009 | Potyrailo et al. |
| 2009/0256717 A1 | 10/2009 | Iwai |
| 2009/0261951 A1 | 10/2009 | Chang et al. |
| 2009/0267729 A1* | 10/2009 | Rowe .......... G06K 19/07758 340/5.8 |
| 2009/0267741 A1 | 10/2009 | Li et al. |
| 2009/0267747 A1 | 10/2009 | Rivest et al. |
| 2009/0272794 A1 | 11/2009 | Lange et al. |
| 2009/0273451 A1 | 11/2009 | Soppera et al. |
| 2009/0273453 A1 | 11/2009 | Tuttle |
| 2009/0278664 A1 | 11/2009 | Jin et al. |
| 2009/0289776 A1 | 11/2009 | Moore et al. |
| 2009/0295537 A1 | 12/2009 | Lane et al. |
| 2009/0295569 A1 | 12/2009 | Corwin et al. |
| 2009/0307529 A1 | 12/2009 | Kim |
| 2009/0314836 A1 | 12/2009 | Kothari et al. |
| 2009/0315670 A1 | 12/2009 | Naressi et al. |
| 2009/0315673 A1 | 12/2009 | Huang |
| 2009/0315679 A1 | 12/2009 | Bauchot et al. |
| 2009/0315686 A1 | 12/2009 | Oberle |
| 2009/0322490 A1 | 12/2009 | Kung et al. |
| 2009/0322537 A1 | 12/2009 | Tapp et al. |
| 2009/0323928 A1 | 12/2009 | Kerschbaum et al. |
| 2010/0001840 A1 | 1/2010 | Kang et al. |
| 2010/0001862 A1 | 1/2010 | Wilson et al. |
| 2010/0007466 A1 | 1/2010 | Shoarinejad et al. |
| 2010/0011211 A1 | 1/2010 | Anemikos et al. |
| 2010/0011212 A1 | 1/2010 | Anemikos et al. |
| 2010/0013638 A1 | 1/2010 | Lee et al. |
| 2010/0014673 A1 | 1/2010 | Lee et al. |
| 2010/0032478 A1 | 2/2010 | Deng |
| 2010/0033300 A1 | 2/2010 | Brandin |
| 2010/0052855 A1 | 3/2010 | Broos et al. |
| 2010/0052862 A1 | 3/2010 | Hsieh et al. |
| 2010/0059431 A1* | 3/2010 | Cho .......... C02F 9/005 210/235 |
| 2010/0060452 A1 | 3/2010 | Schuster et al. |
| 2010/0066510 A1 | 3/2010 | Huang |
| 2010/0073147 A1 | 3/2010 | Guajardo Merchan et al. |
| 2010/0073154 A1 | 3/2010 | Kim et al. |
| 2010/0085154 A1 | 4/2010 | Park et al. |
| 2010/0085157 A1 | 4/2010 | Yoo et al. |
| 2010/0090004 A1 | 4/2010 | Sands et al. |
| 2010/0090005 A1 | 4/2010 | Silverbrook et al. |
| 2010/0097184 A1 | 4/2010 | Bauchot et al. |
| 2010/0114780 A1 | 5/2010 | Tribe et al. |
| 2010/0127869 A1 | 5/2010 | Yu et al. |
| 2010/0134257 A1 | 6/2010 | Puleston et al. |
| 2010/0134258 A1 | 6/2010 | Huang |
| 2010/0134287 A1 | 6/2010 | Lettieri |
| 2010/0135485 A1 | 6/2010 | Lapstun et al. |
| 2010/0138663 A1 | 6/2010 | Silverbrook et al. |
| 2010/0140344 A1 | 6/2010 | Toofan et al. |
| 2010/0146273 A1 | 6/2010 | Kang et al. |
| 2010/0147941 A1 | 6/2010 | Silverbrook et al. |
| 2010/0147942 A1 | 6/2010 | Silverbrook et al. |
| 2010/0148935 A1 | 6/2010 | Graf Von Reischach et al. |
| 2010/0150348 A1 | 6/2010 | Fairbanks et al. |
| 2010/0155467 A1 | 6/2010 | Silverbrook et al. |
| 2010/0155475 A1 | 6/2010 | Paek et al. |
| 2010/0161999 A1 | 6/2010 | Poovendran et al. |
| 2010/0198873 A1 | 8/2010 | Falk et al. |
| 2010/0201488 A1 | 8/2010 | Stern et al. |
| 2010/0201489 A1 | 8/2010 | Griffin |
| 2010/0201520 A1 | 8/2010 | Stern et al. |
| 2010/0214070 A1 | 8/2010 | Ramsay et al. |
| 2010/0224328 A1 | 9/2010 | Utaka et al. |
| 2010/0228585 A1 | 9/2010 | Bradley |
| 2010/0229000 A1 | 9/2010 | Png et al. |
| 2010/0235643 A1 | 9/2010 | Silverbrook et al. |
| 2010/0236598 A1 | 9/2010 | Roy et al. |
| 2010/0238039 A1 | 9/2010 | Tethrake et al. |
| 2010/0277279 A1 | 11/2010 | Kim et al. |
| 2010/0283614 A1 | 11/2010 | Soppera et al. |
| 2010/0289627 A1 | 11/2010 | Mcallister et al. |
| 2010/0308978 A1 | 12/2010 | Brown |
| 2011/0006878 A1 | 1/2011 | Nyffeler et al. |
| 2011/0006900 A1 | 1/2011 | Nyffeler et al. |
| 2011/0018689 A1 | 1/2011 | Mcallister et al. |
| 2011/0018714 A1 | 1/2011 | Jun et al. |
| 2011/0025458 A1 | 2/2011 | Rokhsaz et al. |
| 2011/0025473 A1 | 2/2011 | Rokhsaz et al. |
| 2011/0041046 A1 | 2/2011 | Kang et al. |
| 2011/0062060 A1* | 3/2011 | Royal .......... B01D 65/104 210/85 |
| 2011/0062237 A1 | 3/2011 | Chaves |
| 2011/0066853 A1 | 3/2011 | Engels et al. |
| 2011/0068894 A1 | 3/2011 | Braun |
| 2011/0084130 A1 | 4/2011 | Lapstun et al. |
| 2011/0084839 A1 | 4/2011 | Groth et al. |
| 2011/0095872 A1 | 4/2011 | Bhadriraju et al. |
| 2011/0156870 A1 | 6/2011 | Attew |
| 2011/0161235 A1 | 6/2011 | Beenau et al. |
| 2011/0199185 A1 | 8/2011 | Karaoguz et al. |
| 2011/0215145 A1 | 9/2011 | Silverbrook et al. |
| 2011/0220560 A1* | 9/2011 | Verdegan .......... B01D 35/005 210/90 |
| 2011/0225101 A1 | 9/2011 | Dillon |
| 2011/0227726 A1 | 9/2011 | Lee |
| 2011/0228941 A1 | 9/2011 | Shoarinejad et al. |
| 2011/0231316 A1 | 9/2011 | Carroll, III |
| 2011/0234377 A1 | 9/2011 | Landuyt et al. |
| 2011/0240732 A1 | 10/2011 | Deng |
| 2011/0241838 A1 | 10/2011 | Wischmeyer |
| 2011/0266343 A1 | 11/2011 | Liu |
| 2011/0273294 A1 | 11/2011 | Harwell |
| 2011/0274275 A1 | 11/2011 | Seitz |
| 2011/0279235 A1 | 11/2011 | Lee et al. |
| 2011/0279245 A1 | 11/2011 | Hynes et al. |
| 2011/0284635 A1 | 11/2011 | Lapstun et al. |
| 2011/0291803 A1 | 12/2011 | Bajic et al. |
| 2011/0298593 A1 | 12/2011 | Sugiyama |
| 2011/0300905 A1 | 12/2011 | Levi |
| 2011/0302264 A1 | 12/2011 | Lawrence et al. |
| 2011/0304463 A1 | 12/2011 | Groth et al. |
| 2011/0320805 A1 | 12/2011 | Chaves et al. |
| 2012/0001731 A1 | 1/2012 | Potyrailo et al. |
| 2012/0013448 A1 | 1/2012 | Baranowski |
| 2012/0019398 A1 | 1/2012 | Vogt et al. |
| 2012/0019399 A1 | 1/2012 | Vargo et al. |
| 2012/0075071 A1 | 3/2012 | Liu et al. |
| 2012/0075081 A1 | 3/2012 | Camarota |
| 2012/0087501 A1 | 4/2012 | Shoarinejad et al. |
| 2012/0092134 A1 | 4/2012 | Stern et al. |
| 2012/0098641 A1 | 4/2012 | Whittle |
| 2012/0099725 A1 | 4/2012 | Sakazaki et al. |
| 2012/0111939 A1 | 5/2012 | Silverbrook et al. |
| 2012/0112882 A1 | 5/2012 | Martinez De Velasco Cortina et al. |

(56) References Cited

U.S. PATENT DOCUMENTS

| | | |
|---|---|---|
| 2012/0126945 A1 | 5/2012 | Kim et al. |
| 2012/0126949 A1 | 5/2012 | Downie et al. |
| 2012/0126950 A1 | 5/2012 | Downie et al. |
| 2012/0128157 A1 | 5/2012 | Braun |
| 2012/0133490 A1 | 5/2012 | Downie et al. |
| 2012/0147798 A1 | 6/2012 | Miller et al. |
| 2012/0154111 A1 | 6/2012 | Schattleitner et al. |
| 2012/0161930 A1 | 6/2012 | Subramanian et al. |
| 2012/0161933 A1 | 6/2012 | Shin et al. |
| 2012/0161937 A1 | 6/2012 | Chen |
| 2012/0169468 A1 | 7/2012 | Butler et al. |
| 2012/0169469 A1 | 7/2012 | Butler et al. |
| 2012/0169474 A1 | 7/2012 | Butler et al. |
| 2012/0182123 A1 | 7/2012 | Butler et al. |
| 2012/0187185 A1 | 7/2012 | Sayan |
| 2012/0200389 A1 | 8/2012 | Solomon |
| 2012/0202531 A1 | 8/2012 | Killian et al. |
| 2012/0206243 A1 | 8/2012 | Butler et al. |
| 2012/0218077 A1 | 8/2012 | De Velasco Cortina et al. |
| 2012/0218088 A1 | 8/2012 | Bauchot et al. |
| 2012/0224693 A1 | 9/2012 | Lei et al. |
| 2012/0234908 A1 | 9/2012 | Wang et al. |
| 2012/0242452 A1 | 9/2012 | Bauchot et al. |
| 2012/0249302 A1 | 10/2012 | Szu |
| 2012/0261479 A1 | 10/2012 | Moore et al. |
| 2012/0286937 A1 | 11/2012 | Cote et al. |
| 2012/0286938 A1 | 11/2012 | Cote et al. |
| 2012/0286939 A1 | 11/2012 | Cote et al. |
| 2012/0287095 A1 | 11/2012 | Cote et al. |
| 2012/0298743 A1 | 11/2012 | Voloshynovskyy et al. |
| 2012/0300933 A1 | 11/2012 | Baranowski |
| 2012/0303204 A1* | 11/2012 | Narisako ............ F02M 37/24 701/29.6 |
| 2012/0319823 A1 | 12/2012 | Butler et al. |
| 2013/0015109 A1* | 1/2013 | Holzmann ............ B01D 29/21 210/85 |
| 2013/0033364 A1 | 2/2013 | Raz et al. |
| 2013/0059534 A1 | 3/2013 | Sobalvarro et al. |
| 2013/0068673 A1* | 3/2013 | Maggiore ............ B01D 35/30 210/95 |
| 2013/0077789 A1 | 3/2013 | Tahan et al. |
| 2013/0082841 A1 | 4/2013 | Joseph |
| 2013/0087610 A1 | 4/2013 | Shin et al. |
| 2013/0090757 A1* | 4/2013 | Phan ............ G05B 19/4183 700/215 |
| 2013/0108041 A1 | 5/2013 | Jordahl |
| 2013/0127595 A1 | 5/2013 | Martinez De Velasco Cortina et al. |
| 2013/0134213 A1 | 5/2013 | Pallakoff et al. |
| 2013/0135082 A1 | 5/2013 | Xian et al. |
| 2013/0141218 A1 | 6/2013 | Kuhl et al. |
| 2013/0173383 A1 | 7/2013 | Sharma et al. |
| 2013/0176115 A1 | 7/2013 | Puleston et al. |
| 2013/0180898 A1* | 7/2013 | Chajec ............ B01D 35/30 210/85 |
| 2013/0181817 A1 | 7/2013 | Shoarinejad et al. |
| 2013/0194097 A1 | 8/2013 | Joseph |
| 2013/0201000 A1 | 8/2013 | Solomon |
| 2013/0201337 A1 | 8/2013 | Tapp et al. |
| 2013/0206837 A1 | 8/2013 | Szu |
| 2013/0207780 A1 | 8/2013 | Poovendran et al. |
| 2013/0207783 A1* | 8/2013 | Cruzado ............ G06K 19/07 340/10.5 |
| 2013/0220900 A1* | 8/2013 | Milvert ............ B01D 35/143 210/85 |
| 2013/0230166 A1 | 9/2013 | Bauchot et al. |
| 2013/0230167 A1 | 9/2013 | Bauchot et al. |
| 2013/0282601 A1 | 10/2013 | Pieri |
| 2013/0285678 A1* | 10/2013 | Gwin ............ F02M 37/42 324/656 |
| 2013/0299569 A1 | 11/2013 | Gentile et al. |
| 2013/0320079 A1 | 12/2013 | Nordin et al. |
| 2013/0325288 A1 | 12/2013 | Komine et al. |
| 2013/0330205 A1* | 12/2013 | Apostolides ............ F04B 23/04 417/12 |
| 2014/0008429 A1 | 1/2014 | Wang et al. |
| 2014/0014714 A1 | 1/2014 | Tang |
| 2014/0023195 A1 | 1/2014 | Lee et al. |
| 2014/0033289 A1 | 1/2014 | Solomon |
| 2014/0042225 A1 | 2/2014 | Liu |
| 2014/0055249 A1 | 2/2014 | Garner |
| 2014/0069997 A1 | 3/2014 | Eldefrawy et al. |
| 2014/0076973 A1 | 3/2014 | Nyffeler et al. |
| 2014/0089143 A1 | 3/2014 | Dione |
| 2014/0094965 A1 | 4/2014 | Silverbrook et al. |
| 2014/0095398 A1 | 4/2014 | Lin |
| 2014/0122353 A1 | 5/2014 | Sager et al. |
| 2014/0124570 A1 | 5/2014 | Franklin |
| 2014/0143090 A1 | 5/2014 | Deyle et al. |
| 2014/0144819 A1* | 5/2014 | Verdegan ............ B01D 35/005 210/85 |
| 2014/0145823 A1 | 5/2014 | Aase |
| 2014/0159900 A1 | 6/2014 | Joseph |
| 2014/0169566 A1 | 6/2014 | Baranowski |
| 2014/0183261 A1 | 7/2014 | Ung et al. |
| 2014/0197951 A1 | 7/2014 | Savarese et al. |
| 2014/0203915 A1 | 7/2014 | Puleston et al. |
| 2014/0229387 A1 | 8/2014 | Chow |
| 2014/0231519 A1 | 8/2014 | Requist |
| 2014/0252077 A1 | 9/2014 | Corby |
| 2014/0253289 A1 | 9/2014 | Groth et al. |
| 2014/0258127 A1 | 9/2014 | Chava |
| 2014/0263636 A1 | 9/2014 | Jones et al. |
| 2014/0266591 A1 | 9/2014 | Klammer et al. |
| 2014/0266621 A1 | 9/2014 | Jones et al. |
| 2014/0266626 A1 | 9/2014 | Moulin et al. |
| 2014/0282974 A1 | 9/2014 | Maher et al. |
| 2014/0286491 A1 | 9/2014 | Atherton |
| 2014/0292477 A1 | 10/2014 | Ahmadloo |
| 2014/0292490 A1 | 10/2014 | Butler et al. |
| 2014/0297545 A1 | 10/2014 | Prasad et al. |
| 2014/0301551 A1 | 10/2014 | Adler et al. |
| 2014/0306804 A1 | 10/2014 | Stiefel et al. |
| 2014/0306808 A1 | 10/2014 | Jones et al. |
| 2014/0327524 A1 | 11/2014 | Jones et al. |
| 2014/0341379 A1 | 11/2014 | Fairbanks et al. |
| 2014/0351123 A1 | 11/2014 | Chava |
| 2014/0351141 A1 | 11/2014 | Chava |
| 2014/0351588 A1 | 11/2014 | Hedtke et al. |
| 2014/0358792 A1* | 12/2014 | Berke ............ G06Q 30/018 705/50 |
| 2015/0001298 A1 | 1/2015 | Shoarinejad et al. |
| 2015/0002260 A1 | 1/2015 | Brown |
| 2015/0012457 A1 | 1/2015 | Gonzalez et al. |
| 2015/0015366 A1 | 1/2015 | Hoffman |
| 2015/0022314 A1 | 1/2015 | Povolny |
| 2015/0022359 A1 | 1/2015 | Joseph |
| 2015/0032569 A1 | 1/2015 | Stromberg |
| 2015/0061840 A1 | 3/2015 | Butler et al. |
| 2015/0081899 A1 | 3/2015 | Qu |
| 2015/0083797 A1 | 3/2015 | Tran et al. |
| 2015/0102913 A1 | 4/2015 | Vargo et al. |
| 2015/0102931 A1 | 4/2015 | Chernov et al. |
| 2015/0106113 A1 | 4/2015 | Reddy |
| 2015/0106282 A1 | 4/2015 | Lee et al. |
| 2015/0106283 A1 | 4/2015 | Lee et al. |
| 2015/0108211 A1 | 4/2015 | Higgins et al. |
| 2015/0127552 A1 | 5/2015 | Shoarinejad et al. |
| 2015/0129666 A1 | 5/2015 | Butler et al. |
| 2015/0130593 A1 | 5/2015 | Mats et al. |
| 2015/0134552 A1 | 5/2015 | Engels et al. |
| 2015/0137955 A1 | 5/2015 | Amador et al. |
| 2015/0163057 A1 | 6/2015 | Tahan et al. |
| 2015/0195274 A1 | 7/2015 | Lee et al. |
| 2015/0208245 A1 | 7/2015 | Robinton et al. |
| 2015/0213067 A1 | 7/2015 | Yin |
| 2015/0227959 A1 | 8/2015 | Qu |
| 2015/0254677 A1 | 9/2015 | Huxham et al. |
| 2015/0257002 A1 | 9/2015 | Miller et al. |
| 2015/0269331 A1 | 9/2015 | Bolanos et al. |
| 2015/0302234 A1 | 10/2015 | Mats et al. |
| 2015/0310453 A1 | 10/2015 | Kolton |

(56) References Cited

U.S. PATENT DOCUMENTS

| | | | |
|---|---|---|---|
| 2015/0310715 A1* | 10/2015 | Nekoogar | G08B 13/06 340/572.1 |
| 2015/0324681 A1 | 11/2015 | Mats et al. | |
| 2015/0339894 A1 | 11/2015 | Ramachandran et al. | |
| 2015/0360671 A1* | 12/2015 | Williams | F16D 65/0043 701/70 |
| 2015/0361840 A1* | 12/2015 | Verdegan | B01D 35/143 702/34 |
| 2015/0379317 A1 | 12/2015 | Kelly et al. | |
| 2015/0379459 A1 | 12/2015 | Russell et al. | |
| 2015/0379791 A1 | 12/2015 | Russell et al. | |
| 2016/0012498 A1 | 1/2016 | Prasad | |
| 2016/0021091 A1 | 1/2016 | Hoyer et al. | |
| 2016/0021100 A1 | 1/2016 | Hoyer | |
| 2016/0026834 A1 | 1/2016 | Jones et al. | |
| 2016/0027021 A1 | 1/2016 | Kerdemelidis | |
| 2016/0028710 A1 | 1/2016 | Shoarinejad et al. | |
| 2016/0033635 A1 | 2/2016 | Hansen | |
| 2016/0034728 A1 | 2/2016 | Oliver et al. | |
| 2016/0036786 A1 | 2/2016 | Gandhi | |
| 2016/0042032 A1 | 2/2016 | Rosati et al. | |
| 2016/0046502 A1* | 2/2016 | Rice | C02F 1/003 210/85 |
| 2016/0048709 A1 | 2/2016 | Butler et al. | |
| 2016/0048712 A1 | 2/2016 | Butler et al. | |
| 2016/0067639 A1* | 3/2016 | Shimpi | B01D 46/429 210/85 |
| 2016/0092705 A1 | 3/2016 | Wadman et al. | |
| 2016/0110571 A1 | 4/2016 | Jung et al. | |
| 2016/0117583 A1 | 4/2016 | Butler et al. | |
| 2016/0117685 A1 | 4/2016 | Bassi | |
| 2016/0132704 A1 | 5/2016 | Engels et al. | |
| 2016/0139104 A1* | 5/2016 | Massey | G01N 27/22 436/60 |
| 2016/0140820 A1 | 5/2016 | Joseph | |
| 2016/0148026 A1 | 5/2016 | Grimaux | |
| 2016/0180314 A1 | 6/2016 | Zemek | |
| 2016/0210084 A1 | 7/2016 | Butler et al. | |
| 2016/0210547 A1 | 7/2016 | Dekeyser et al. | |
| 2016/0220876 A1 | 8/2016 | Savarese et al. | |
| 2016/0224814 A1 | 8/2016 | Stiefel et al. | |
| 2016/0239696 A1 | 8/2016 | Mats et al. | |
| 2016/0246892 A1 | 8/2016 | Murrah et al. | |
| 2016/0273471 A1* | 9/2016 | Shimpi | B01D 35/143 |
| 2016/0296864 A1* | 10/2016 | Shimpi | B01D 35/005 |
| 2017/0048709 A1* | 2/2017 | Patel | C02F 1/001 |
| 2017/0173505 A1* | 6/2017 | Dhingra | F02M 37/28 |
| 2017/0174126 A1* | 6/2017 | Schmitt | G07C 5/08 |
| 2018/0040174 A1* | 2/2018 | Koshi | E02F 9/268 |
| 2018/0056899 A1* | 3/2018 | Franz | G07C 5/008 |
| 2018/0144559 A1* | 5/2018 | Hukill | G07C 5/008 |
| 2018/0214801 A1* | 8/2018 | Shimpi | F02D 41/22 |
| 2018/0221796 A1* | 8/2018 | Bonifas | B01D 35/143 |
| 2018/0229161 A1* | 8/2018 | Maki | B01D 27/101 |
| 2018/0335368 A1* | 11/2018 | Dhingra | B01D 46/429 |
| 2019/0076760 A1* | 3/2019 | Surdick | B01D 29/21 |
| 2019/0120157 A1* | 4/2019 | Shimpi | F02D 41/22 |
| 2019/0153971 A1* | 5/2019 | Prabhala | B01D 35/005 |
| 2019/0168140 A1* | 6/2019 | Vaidya | B01D 35/005 |
| 2019/0176065 A1* | 6/2019 | Shimpi | B01D 35/143 |
| 2019/0344201 A1* | 11/2019 | Holzmann | B01D 29/111 |
| 2019/0374889 A1* | 12/2019 | Vaidya | G06F 5/06 |

FOREIGN PATENT DOCUMENTS

| | | | | |
|---|---|---|---|---|
| EP | 3328089 A1 * | 5/2018 | | B01D 46/0086 |
| JP | 2005273196 A * | 10/2005 | | F01M 11/10 |
| JP | 2008025234 A * | 2/2008 | | |
| WO | WO-00/04480 A1 | 1/2000 | | |
| WO | WO-00/07121 A1 | 2/2000 | | |
| WO | WO-00/10144 A1 | 2/2000 | | |
| WO | WO-00/36849 A1 | 6/2000 | | |
| WO | WO-00/46734 A2 | 8/2000 | | |
| WO | WO-00/50974 A2 | 8/2000 | | |
| WO | WO-00/55818 A2 | 9/2000 | | |
| WO | WO-00/58833 A1 | 10/2000 | | |
| WO | WO-00/62232 A1 | 10/2000 | | |
| WO | WO-00/68911 A1 | 11/2000 | | |
| WO | WO-00/72119 A2 | 11/2000 | | |
| WO | WO-00/72507 A1 | 11/2000 | | |
| WO | WO-00/77700 A1 | 12/2000 | | |
| WO | WO-01/06401 A1 | 1/2001 | | |
| WO | WO-01/06507 A1 | 1/2001 | | |
| WO | WO-01/09701 A1 | 2/2001 | | |
| WO | WO-01/26047 A1 | 4/2001 | | |
| WO | WO-01/29778 A1 | 4/2001 | | |
| WO | WO-01/29779 A1 | 4/2001 | | |
| WO | WO-01/43095 A2 | 6/2001 | | |
| WO | WO-01/52636 A1 | 7/2001 | | |
| WO | WO-01/57807 A1 | 8/2001 | | |
| WO | WO-01/63404 A1 | 8/2001 | | |
| WO | WO-01/63440 A2 | 8/2001 | | |
| WO | WO-01/65814 A1 | 9/2001 | | |
| WO | WO-01/72107 A2 | 10/2001 | | |
| WO | WO-01/79988 A1 | 10/2001 | | |
| WO | WO-01/80139 A2 | 10/2001 | | |
| WO | WO-01/80146 A1 | 10/2001 | | |
| WO | WO-01/84439 A1 | 11/2001 | | |
| WO | WO-01/95266 A2 | 12/2001 | | |
| WO | WO-01/97480 A2 | 12/2001 | | |
| WO | WO-02/01462 A2 | 1/2002 | | |
| WO | WO-02/01467 A2 | 1/2002 | | |
| WO | WO-02/05471 A2 | 1/2002 | | |
| WO | WO-02/07078 A1 | 1/2002 | | |
| WO | WO-02/07081 A1 | 1/2002 | | |
| WO | WO-02/08981 A1 | 1/2002 | | |
| WO | WO-02/10962 A1 | 2/2002 | | |
| WO | WO-02/15139 A1 | 2/2002 | | |
| WO | WO-02/21424 A2 | 3/2002 | | |
| WO | WO-02/29661 A1 | 4/2002 | | |
| WO | WO-02/31629 A1 | 4/2002 | | |
| WO | WO-02/33511 A2 | 4/2002 | | |
| WO | WO-02/41237 A1 | 5/2002 | | |
| WO | WO-02/47485 A2 | 6/2002 | | |
| WO | WO-02/50761 A1 | 6/2002 | | |
| WO | WO-02/056133 A2 | 7/2002 | | |
| WO | WO-02/056306 A2 | 7/2002 | | |
| WO | WO-02/058306 A2 | 7/2002 | | |
| WO | WO-02/063545 A2 | 8/2002 | | |
| WO | WO-02/065371 A1 | 8/2002 | | |
| WO | WO-02/069242 A2 | 9/2002 | | |
| WO | WO-02/075684 A1 | 9/2002 | | |
| WO | WO-02/084615 A1 | 10/2002 | | |
| WO | WO-02/089135 A1 | 11/2002 | | |
| WO | WO-02/093830 A2 | 11/2002 | | |
| WO | WO-02/099730 A2 | 12/2002 | | |
| WO | WO-02/101593 A2 | 12/2002 | | |
| WO | WO-03/005251 A1 | 1/2003 | | |
| WO | WO-03/005295 A1 | 1/2003 | | |
| WO | WO-03/013062 A1 | 2/2003 | | |
| WO | WO-03/019502 A1 | 3/2003 | | |
| WO | WO-03/021974 A1 | 3/2003 | | |
| WO | WO-2006/031088 A1 | 3/2003 | | |
| WO | WO-03/027718 A1 | 4/2003 | | |
| WO | WO-03/027929 A1 | 4/2003 | | |
| WO | WO-03/032224 A1 | 4/2003 | | |
| WO | WO-03/044743 A2 | 5/2003 | | |
| WO | WO-03/046686 A2 | 6/2003 | | |
| WO | WO-03/050757 A1 | 6/2003 | | |
| WO | WO-03/058485 A1 | 7/2003 | | |
| WO | WO-03/058506 A1 | 7/2003 | | |
| WO | WO-03/058520 A1 | 7/2003 | | |
| WO | WO-03/060644 A2 | 7/2003 | | |
| WO | WO-03/060819 A1 | 7/2003 | | |
| WO | WO-03/067375 A2 | 8/2003 | | |
| WO | WO-03/069823 A1 | 8/2003 | | |
| WO | WO-03/073370 A1 | 9/2003 | | |
| WO | WO-03/088155 A1 | 10/2003 | | |
| WO | WO-03/098175 A1 | 11/2003 | | |
| WO | WO-03/098908 A1 | 11/2003 | | |
| WO | WO-03/102845 A2 | 12/2003 | | |
| WO | WO-03/105194 A2 | 12/2003 | | |
| WO | WO-03/107289 A1 | 12/2003 | | |

(56) References Cited

FOREIGN PATENT DOCUMENTS

| | | |
|---|---|---|
| WO | WO-2004/006197 A1 | 1/2004 |
| WO | WO-2004/008387 A1 | 1/2004 |
| WO | WO-2004/017184 A1 | 2/2004 |
| WO | WO-2004/023379 A1 | 3/2004 |
| WO | WO-2004/023389 A2 | 3/2004 |
| WO | WO-2004/023392 A1 | 3/2004 |
| WO | WO-2004/025554 A1 | 3/2004 |
| WO | WO-2004/032025 A1 | 4/2004 |
| WO | WO-2004/032027 A1 | 4/2004 |
| WO | WO-2004/034180 A2 | 4/2004 |
| WO | WO-2004/034321 A1 | 4/2004 |
| WO | WO-2004/036482 A2 | 4/2004 |
| WO | WO-2004/038644 A2 | 5/2004 |
| WO | WO-2004/041058 A2 | 5/2004 |
| WO | WO-2004/049237 A2 | 6/2004 |
| WO | WO-2004/072847 A1 | 8/2004 |
| WO | WO-2004/075098 A1 | 9/2004 |
| WO | WO-2004/079634 A1 | 9/2004 |
| WO | WO-2004/084481 A1 | 9/2004 |
| WO | WO-2004/088571 A2 | 10/2004 |
| WO | WO-2004/088579 A2 | 10/2004 |
| WO | WO-2004/089017 A1 | 10/2004 |
| WO | WO-2004/092999 A2 | 10/2004 |
| WO | WO-2004/100029 A1 | 11/2004 |
| WO | WO-2004/100098 A1 | 11/2004 |
| WO | WO-2004/102312 A2 | 11/2004 |
| WO | WO-2004/111924 A2 | 12/2004 |
| WO | WO-2004/114086 A2 | 12/2004 |
| WO | WO-2004/114240 A2 | 12/2004 |
| WO | WO-2005/001669 A2 | 1/2005 |
| WO | WO-2005/004036 A1 | 1/2005 |
| WO | WO-2005/008563 A2 | 1/2005 |
| WO | WO-2005/015480 A2 | 2/2005 |
| WO | WO-2005/015486 A1 | 2/2005 |
| WO | WO-2005/022454 A1 | 3/2005 |
| WO | WO-2005/022474 A1 | 3/2005 |
| WO | WO-2005/024697 A2 | 3/2005 |
| WO | WO-2005/026895 A2 | 3/2005 |
| WO | WO-2005/027022 A2 | 3/2005 |
| WO | WO-2005/029764 A1 | 3/2005 |
| WO | WO-2005/031593 A1 | 4/2005 |
| WO | WO-2005/036336 A2 | 4/2005 |
| WO | WO-2005/043350 A2 | 5/2005 |
| WO | WO-2005/045743 A2 | 5/2005 |
| WO | WO-2005/057510 A1 | 6/2005 |
| WO | WO-2005/059812 A2 | 6/2005 |
| WO | WO-2005/056878 A1 | 7/2005 |
| WO | WO-2005/062247 A1 | 7/2005 |
| WO | WO-2005/065363 A2 | 7/2005 |
| WO | WO-2005/071597 A1 | 8/2005 |
| WO | WO-2005/071978 A1 | 8/2005 |
| WO | WO-2005/073897 A1 | 8/2005 |
| WO | WO-2005/073903 A1 | 8/2005 |
| WO | WO-2005/076106 A1 | 8/2005 |
| WO | WO-2005/079338 A1 | 9/2005 |
| WO | WO-2005/079359 A2 | 9/2005 |
| WO | WO-2005/079493 A1 | 9/2005 |
| WO | WO-2005/081086 A1 | 9/2005 |
| WO | WO-2005/081088 A1 | 9/2005 |
| WO | WO-2005/081144 A1 | 9/2005 |
| WO | WO-2005/081167 A1 | 9/2005 |
| WO | WO-2005/081174 A1 | 9/2005 |
| WO | WO-2005/084354 A1 | 9/2005 |
| WO | WO-2005/085980 A2 | 9/2005 |
| WO | WO-2005/086073 A1 | 9/2005 |
| WO | WO-2005/088504 A1 | 9/2005 |
| WO | WO-2005/088523 A1 | 9/2005 |
| WO | WO-2005/089402 A2 | 9/2005 |
| WO | WO-2005/091959 A2 | 10/2005 |
| WO | WO-2005/096237 A1 | 10/2005 |
| WO | WO-2005/106722 A1 | 11/2005 |
| WO | WO-2005/106748 A2 | 11/2005 |
| WO | WO-2005/106807 A1 | 11/2005 |
| WO | WO-2005/106814 A2 | 11/2005 |
| WO | WO-2005/109280 A2 | 11/2005 |
| WO | WO-2005/109882 A2 | 11/2005 |
| WO | WO-2005/111925 A1 | 11/2005 |
| WO | WO-2005/111959 A2 | 11/2005 |
| WO | WO-2005/114602 A2 | 12/2005 |
| WO | WO-2005/114603 A2 | 12/2005 |
| WO | WO-2005/114604 A2 | 12/2005 |
| WO | WO-2005/117527 A2 | 12/2005 |
| WO | WO-2005/120086 A1 | 12/2005 |
| WO | WO-2005/122041 A2 | 12/2005 |
| WO | WO-2005/122489 A2 | 12/2005 |
| WO | WO-2005/124666 A1 | 12/2005 |
| WO | WO-2005/124719 A1 | 12/2005 |
| WO | WO-2006/005122 A1 | 1/2006 |
| WO | WO-2006/009040 A1 | 1/2006 |
| WO | WO-2006/009460 A1 | 1/2006 |
| WO | WO-2006/010271 A1 | 2/2006 |
| WO | WO-2006/011729 A1 | 2/2006 |
| WO | WO-2006/013637 A1 | 2/2006 |
| WO | WO-2006/014532 A2 | 2/2006 |
| WO | WO-2006/014743 A2 | 2/2006 |
| WO | WO-2006/014803 A2 | 2/2006 |
| WO | WO-2006/014813 A2 | 2/2006 |
| WO | WO-2006/015145 A1 | 2/2006 |
| WO | WO-2006/015617 A1 | 2/2006 |
| WO | WO-2006/016778 A2 | 2/2006 |
| WO | WO-2006/016845 A1 | 2/2006 |
| WO | WO-2006/017132 A2 | 2/2006 |
| WO | WO-2006/017469 A2 | 2/2006 |
| WO | WO-2006/018451 A1 | 2/2006 |
| WO | WO-2006/019854 A2 | 2/2006 |
| WO | WO-2006/020152 A1 | 2/2006 |
| WO | WO-2006/023601 A2 | 3/2006 |
| WO | WO-2006/024918 A2 | 3/2006 |
| WO | WO-2006/026246 A1 | 3/2006 |
| WO | WO-2006/029105 A2 | 3/2006 |
| WO | WO-2006/031127 A2 | 3/2006 |
| WO | WO-2006/031199 A1 | 3/2006 |
| WO | WO-2006/031360 A2 | 3/2006 |
| WO | WO-2006/031822 A2 | 3/2006 |
| WO | WO-2006/031824 A2 | 3/2006 |
| WO | WO-2006/032942 A1 | 3/2006 |
| WO | WO-2006/035401 A2 | 4/2006 |
| WO | WO-2006/035430 A2 | 4/2006 |
| WO | WO-2006/036372 A1 | 4/2006 |
| WO | WO-2006/036978 A2 | 4/2006 |
| WO | WO-2006/039180 A2 | 4/2006 |
| WO | WO-2006/039746 A1 | 4/2006 |
| WO | WO-2006/040829 A1 | 4/2006 |
| WO | WO-2006/044178 A1 | 4/2006 |
| WO | WO-2006/045819 A2 | 5/2006 |
| WO | WO-2006/046413 A1 | 5/2006 |
| WO | WO-2006/047701 A2 | 5/2006 |
| WO | WO-2006/049374 A1 | 5/2006 |
| WO | WO-2006/049636 A2 | 5/2006 |
| WO | WO-2006/052488 A2 | 5/2006 |
| WO | WO-2006/052683 A1 | 5/2006 |
| WO | WO-2006/053058 A2 | 5/2006 |
| WO | WO-2006/053385 A1 | 5/2006 |
| WO | WO-2006/054318 A2 | 5/2006 |
| WO | WO-2006/055737 A2 | 5/2006 |
| WO | WO-2006055295 A1 * | 5/2006 ........... B01D 35/143 |
| WO | WO-2006/056280 A1 | 6/2006 |
| WO | WO-2006/059139 A2 | 6/2006 |
| WO | WO-2006/059343 A2 | 6/2006 |
| WO | WO-2006/060238 A2 | 6/2006 |
| WO | WO-2006/061698 A1 | 6/2006 |
| WO | WO-2006/065250 A1 | 6/2006 |
| WO | WO-2006/065296 A2 | 6/2006 |
| WO | WO-2006/065389 A2 | 6/2006 |
| WO | WO-2006/065409 A2 | 6/2006 |
| WO | WO-2006/066378 A1 | 6/2006 |
| WO | WO-2006/068337 A1 | 6/2006 |
| WO | WO-2006/068338 A1 | 6/2006 |
| WO | WO-2006/068382 A1 | 6/2006 |
| WO | WO-2006/068999 A2 | 6/2006 |
| WO | WO-2006/070461 A1 | 7/2006 |
| WO | WO-2006/070462 A1 | 7/2006 |
| WO | WO-2006/073296 A1 | 7/2006 |
| WO | WO-2006/074096 A2 | 7/2006 |

(56) References Cited

FOREIGN PATENT DOCUMENTS

| | | |
|---|---|---|
| WO | WO-2006/075146 A1 | 7/2006 |
| WO | WO-2006/075917 A2 | 7/2006 |
| WO | WO-2006/076168 A2 | 7/2006 |
| WO | WO-2006/076283 A1 | 7/2006 |
| WO | WO-2006/076313 A1 | 7/2006 |
| WO | WO-2006/078965 A2 | 7/2006 |
| WO | WO-2006/083078 A1 | 8/2006 |
| WO | WO-2006/083468 A2 | 8/2006 |
| WO | WO-2006/086409 A2 | 8/2006 |
| WO | WO-2006/086601 A2 | 8/2006 |
| WO | WO-2006/087764 A1 | 8/2006 |
| WO | WO-2006/091585 A2 | 8/2006 |
| WO | WO-2006/092626 A1 | 9/2006 |
| WO | WO-2006/092988 A1 | 9/2006 |
| WO | WO-2006/093992 A2 | 9/2006 |
| WO | WO-2006/094030 A2 | 9/2006 |
| WO | WO-2006/096252 A1 | 9/2006 |
| WO | WO-2006/096431 A2 | 9/2006 |
| WO | WO-2006/098004 A1 | 9/2006 |
| WO | WO-2006/098578 A1 | 9/2006 |
| WO | WO-2006/098985 A2 | 9/2006 |
| WO | WO-2006/099123 A2 | 9/2006 |
| WO | WO-2006/100742 A1 | 9/2006 |
| WO | WO-2006/101698 A2 | 9/2006 |
| WO | WO-2006/103522 A1 | 10/2006 |
| WO | WO-2006/104354 A1 | 10/2006 |
| WO | WO-2006/105606 A1 | 10/2006 |
| WO | WO-2006/107397 A2 | 10/2006 |
| WO | WO-2006/107976 A1 | 10/2006 |
| WO | WO-2006/109700 A1 | 10/2006 |
| WO | WO-2006/110257 A2 | 10/2006 |
| WO | WO-2006/110624 A2 | 10/2006 |
| WO | WO-2006/112608 A1 | 10/2006 |
| WO | WO-2006/113660 A1 | 10/2006 |
| WO | WO-2006/114811 A1 | 11/2006 |
| WO | WO-2006/115373 A1 | 11/2006 |
| WO | WO-2006/115376 A1 | 11/2006 |
| WO | WO-2006/115756 A1 | 11/2006 |
| WO | WO-2006/115958 A1 | 11/2006 |
| WO | WO-2006/116042 A2 | 11/2006 |
| WO | WO-2006/116084 A2 | 11/2006 |
| WO | WO-2006/116085 A2 | 11/2006 |
| WO | WO-2006/116235 A2 | 11/2006 |
| WO | WO-2006/116236 A2 | 11/2006 |
| WO | WO-2006/116237 A2 | 11/2006 |
| WO | WO-2006/119442 A2 | 11/2006 |
| WO | WO-2006/122041 A2 | 11/2006 |
| WO | WO-2006/123413 A1 | 11/2006 |
| WO | WO-2006/123920 A1 | 11/2006 |
| WO | WO-2006/124763 A2 | 11/2006 |
| WO | WO-2006/125296 A1 | 11/2006 |
| WO | WO-2006/126194 A1 | 11/2006 |
| WO | WO-2006/129357 A1 | 12/2006 |
| WO | WO-2006/129370 A1 | 12/2006 |
| WO | WO-2006/131861 A1 | 12/2006 |
| WO | WO-2006/132652 A2 | 12/2006 |
| WO | WO-2006/134658 A1 | 12/2006 |
| WO | WO-2006/135134 A1 | 12/2006 |
| WO | WO-2006/137632 A1 | 12/2006 |
| WO | WO-2006/137633 A1 | 12/2006 |
| WO | WO-2006/137740 A1 | 12/2006 |
| WO | WO-2007/001129 A1 | 1/2007 |
| WO | WO-2007/001666 A1 | 1/2007 |
| WO | WO-2007/002941 A2 | 1/2007 |
| WO | WO-2007/005134 A2 | 1/2007 |
| WO | WO-2007/005526 A2 | 1/2007 |
| WO | WO-2007/006005 A2 | 1/2007 |
| WO | WO-2007/006085 A1 | 1/2007 |
| WO | WO-2007/011863 A2 | 1/2007 |
| WO | WO-2007/021648 A2 | 2/2007 |
| WO | WO-2007/022282 A2 | 2/2007 |
| WO | WO-2007/025061 A2 | 3/2007 |
| WO | WO-2007/027220 A2 | 3/2007 |
| WO | WO-2007/027302 A2 | 3/2007 |
| WO | WO-2007/029922 A1 | 3/2007 |
| WO | WO-2007/030394 A2 | 3/2007 |
| WO | WO-2007/030544 A2 | 3/2007 |
| WO | WO-2007/031852 A1 | 3/2007 |
| WO | WO-2007/032954 A1 | 3/2007 |
| WO | WO-2007/033294 A2 | 3/2007 |
| WO | WO-2007/034211 A2 | 3/2007 |
| WO | WO-2007/036901 A2 | 4/2007 |
| WO | WO-2007/037595 A1 | 4/2007 |
| WO | WO-2007/040593 A2 | 4/2007 |
| WO | WO-2007/045848 A1 | 4/2007 |
| WO | WO-2007/049072 A1 | 5/2007 |
| WO | WO-2007/053355 A1 | 5/2007 |
| WO | WO-2007/055558 A1 | 5/2007 |
| WO | WO-2007/056333 A2 | 5/2007 |
| WO | WO-2007/059105 A2 | 5/2007 |
| WO | WO-2007/059184 A2 | 5/2007 |
| WO | WO-2007/060619 A1 | 5/2007 |
| WO | WO-2007/061867 A1 | 5/2007 |
| WO | WO-2007/062253 A2 | 5/2007 |
| WO | WO-2007/064747 A1 | 6/2007 |
| WO | WO-2007/066861 A1 | 6/2007 |
| WO | WO-2007/068002 A2 | 6/2007 |
| WO | WO-2007/068519 A2 | 6/2007 |
| WO | WO-2007/070188 A2 | 6/2007 |
| WO | WO-2007/070938 A1 | 6/2007 |
| WO | WO-2007/073476 A2 | 6/2007 |
| WO | WO-2007/074324 A1 | 7/2007 |
| WO | WO-2007/074328 A1 | 7/2007 |
| WO | WO-2007/076095 A2 | 7/2007 |
| WO | WO-2007/076418 A2 | 7/2007 |
| WO | WO-2007/078329 A2 | 7/2007 |
| WO | WO-2007/078331 A1 | 7/2007 |
| WO | WO-2007/081127 A1 | 7/2007 |
| WO | WO-2007/081128 A1 | 7/2007 |
| WO | WO-2007/081129 A1 | 7/2007 |
| WO | WO-2007/081519 A2 | 7/2007 |
| WO | WO-2007/082603 A1 | 7/2007 |
| WO | WO-2007/084896 A2 | 7/2007 |
| WO | WO-2007/084966 A2 | 7/2007 |
| WO | WO-2007/087569 A1 | 8/2007 |
| WO | WO-2007/091854 A1 | 8/2007 |
| WO | WO-2007/094537 A1 | 8/2007 |
| WO | WO-2007/095204 A2 | 8/2007 |
| WO | WO-2007/095566 A2 | 8/2007 |
| WO | WO-2007/106045 A1 | 9/2007 |
| WO | WO-2007/106231 A2 | 9/2007 |
| WO | WO-2007/106283 A1 | 9/2007 |
| WO | WO-2007/108576 A1 | 9/2007 |
| WO | WO-2007/109241 A2 | 9/2007 |
| WO | WO-2007/111598 A1 | 10/2007 |
| WO | WO-2007/117073 A1 | 10/2007 |
| WO | WO-2007/117674 A2 | 10/2007 |
| WO | WO-2007/118591 A1 | 10/2007 |
| WO | WO-2007/120560 A2 | 10/2007 |
| WO | WO-2007/129799 A1 | 11/2007 |
| WO | WO-2007/131243 A2 | 11/2007 |
| WO | WO-2007/131839 A1 | 11/2007 |
| WO | WO-2007/133322 A2 | 11/2007 |
| WO | WO-2007/133507 A2 | 11/2007 |
| WO | WO-2007/136279 A1 | 11/2007 |
| WO | WO-2007/136353 A1 | 11/2007 |
| WO | WO-2007/136999 A2 | 11/2007 |
| WO | WO-2007/141792 A1 | 12/2007 |
| WO | WO-2007/143215 A2 | 12/2007 |
| WO | WO-2007/146446 A1 | 12/2007 |
| WO | WO-2007/147230 A1 | 12/2007 |
| WO | WO-2008/002392 A2 | 1/2008 |
| WO | WO-2008/004755 A1 | 1/2008 |
| WO | WO-2008/009023 A2 | 1/2008 |
| WO | WO-2008/013356 A1 | 1/2008 |
| WO | WO-2008/013396 A1 | 1/2008 |
| WO | WO-2008/015458 A1 | 2/2008 |
| WO | WO-2008/017889 A1 | 2/2008 |
| WO | WO-2008/024106 A2 | 2/2008 |
| WO | WO-2008/024531 A2 | 2/2008 |
| WO | WO-2008/027175 A2 | 3/2008 |
| WO | WO-2008/027619 A2 | 3/2008 |
| WO | WO-2008/027622 A2 | 3/2008 |
| WO | WO-2008/027623 A2 | 3/2008 |

(56) References Cited

FOREIGN PATENT DOCUMENTS

| | | |
|---|---|---|
| WO | WO-2008/027650 A2 | 3/2008 |
| WO | WO-2008/028291 A1 | 3/2008 |
| WO | WO-2008/030184 A1 | 3/2008 |
| WO | WO-2008/030659 A2 | 3/2008 |
| WO | WO-2008/032892 A1 | 3/2008 |
| WO | WO-2008/033590 A2 | 3/2008 |
| WO | WO-2008/033954 A2 | 3/2008 |
| WO | WO-2008/033970 A1 | 3/2008 |
| WO | WO-2008/035721 A1 | 3/2008 |
| WO | WO-2008/035954 A1 | 3/2008 |
| WO | WO-2008/036451 A2 | 3/2008 |
| WO | WO-2008/038899 A1 | 4/2008 |
| WO | WO-2008/043668 A2 | 4/2008 |
| WO | WO-2008/045030 A2 | 4/2008 |
| WO | WO-2008/047353 A1 | 4/2008 |
| WO | WO-2008/048059 A1 | 4/2008 |
| WO | WO-2008/048766 A1 | 4/2008 |
| WO | WO-2008/049086 A2 | 4/2008 |
| WO | WO-2008/051551 A2 | 5/2008 |
| WO | WO-2008/052811 A1 | 5/2008 |
| WO | WO-2008/054071 A1 | 5/2008 |
| WO | WO-2008/054410 A2 | 5/2008 |
| WO | WO-2008/054847 A2 | 5/2008 |
| WO | WO-2008/054950 A2 | 5/2008 |
| WO | WO-2008/055106 A2 | 5/2008 |
| WO | WO-2008/057295 A2 | 5/2008 |
| WO | WO-2008/059191 A1 | 5/2008 |
| WO | WO-2008/060016 A1 | 5/2008 |
| WO | WO-2008/060074 A1 | 5/2008 |
| WO | WO-2008/060242 A1 | 5/2008 |
| WO | WO-2008/060638 A2 | 5/2008 |
| WO | WO-2008/063793 A2 | 5/2008 |
| WO | WO-2008/065649 A2 | 6/2008 |
| WO | WO-2008/067068 A1 | 6/2008 |
| WO | WO-2008/069403 A1 | 6/2008 |
| WO | WO-2008/069625 A1 | 6/2008 |
| WO | WO-2008/069891 A2 | 6/2008 |
| WO | WO-2008/069892 A2 | 6/2008 |
| WO | WO-2008/069923 A1 | 6/2008 |
| WO | WO-2008/070071 A1 | 6/2008 |
| WO | WO-2008/070326 A2 | 6/2008 |
| WO | WO-2008/072080 A2 | 6/2008 |
| WO | WO-2008/073810 A1 | 6/2008 |
| WO | WO-2008/076235 A1 | 6/2008 |
| WO | WO-2008/078328 A2 | 7/2008 |
| WO | WO-2008/079377 A1 | 7/2008 |
| WO | WO-2008/080718 A1 | 7/2008 |
| WO | WO-2008/081452 A2 | 7/2008 |
| WO | WO-2008/081551 A1 | 7/2008 |
| WO | WO-2008/085200 A2 | 7/2008 |
| WO | WO-2008/086393 A1 | 7/2008 |
| WO | WO-2008/088817 A1 | 7/2008 |
| WO | WO-2008/089854 A1 | 7/2008 |
| WO | WO-2008/091978 A2 | 7/2008 |
| WO | WO-2008/092366 A1 | 8/2008 |
| WO | WO-2008/094461 A2 | 8/2008 |
| WO | WO-2008/094506 A1 | 8/2008 |
| WO | WO-2008/094728 A1 | 8/2008 |
| WO | WO-2008/095858 A1 | 8/2008 |
| WO | WO-2008/096471 A1 | 8/2008 |
| WO | WO-2008/106329 A2 | 9/2008 |
| WO | WO-2008/109309 A1 | 9/2008 |
| WO | WO-2008/109672 A2 | 9/2008 |
| WO | WO-2008/110786 A2 | 9/2008 |
| WO | WO-2008/110791 A2 | 9/2008 |
| WO | WO-2008/112382 A1 | 9/2008 |
| WO | WO-2008/113085 A2 | 9/2008 |
| WO | WO-2008/117959 A1 | 10/2008 |
| WO | WO-2008/118595 A1 | 10/2008 |
| WO | WO-2008/118875 A1 | 10/2008 |
| WO | WO-2008/126761 A1 | 10/2008 |
| WO | WO-2008/127723 A2 | 10/2008 |
| WO | WO-2008/128310 A2 | 10/2008 |
| WO | WO-2008/133613 A1 | 11/2008 |
| WO | WO-2008/134381 A1 | 11/2008 |
| WO | WO-2008/137713 A1 | 11/2008 |
| WO | WO-2008/139147 A1 | 11/2008 |
| WO | WO-2008/140847 A1 | 11/2008 |
| WO | WO-2008/143366 A1 | 11/2008 |
| WO | WO-2008/146179 A1 | 12/2008 |
| WO | WO-2008/148220 A1 | 12/2008 |
| WO | WO-2008/153550 A2 | 12/2008 |
| WO | WO-2009/001408 A1 | 12/2008 |
| WO | WO-2009/001989 A1 | 12/2008 |
| WO | WO-2009/003534 A1 | 1/2009 |
| WO | WO-2009/003807 A1 | 1/2009 |
| WO | WO-2009/004366 A1 | 1/2009 |
| WO | WO-2009/005235 A1 | 1/2009 |
| WO | WO-2009/005236 A2 | 1/2009 |
| WO | WO-2009/005831 A1 | 1/2009 |
| WO | WO-2009/008577 A1 | 1/2009 |
| WO | WO-2009/012248 A1 | 1/2009 |
| WO | WO-2009/014847 A1 | 1/2009 |
| WO | WO-2009/018156 A1 | 2/2009 |
| WO | WO-2009/025497 A1 | 2/2009 |
| WO | WO-2009/029595 A1 | 3/2009 |
| WO | WO-2009/029596 A2 | 3/2009 |
| WO | WO-2009/030531 A1 | 3/2009 |
| WO | WO-2009/031373 A1 | 3/2009 |
| WO | WO-2009/034526 A2 | 3/2009 |
| WO | WO-2009/037593 A2 | 3/2009 |
| WO | WO-2009/038247 A1 | 3/2009 |
| WO | WO-2009/042578 A1 | 4/2009 |
| WO | WO-2009/044661 A1 | 4/2009 |
| WO | WO-2009/044687 A1 | 4/2009 |
| WO | WO-2009/046088 A1 | 4/2009 |
| WO | WO-2009/048275 A2 | 4/2009 |
| WO | WO-2009/052059 A1 | 4/2009 |
| WO | WO-2009/054554 A1 | 4/2009 |
| WO | WO-2009/054648 A2 | 4/2009 |
| WO | WO-2009/055279 A1 | 4/2009 |
| WO | WO-2009/061139 A1 | 5/2009 |
| WO | WO-2009/063471 A2 | 5/2009 |
| WO | WO-2009/063815 A1 | 5/2009 |
| WO | WO-2009/064131 A2 | 5/2009 |
| WO | WO-2009/064566 A1 | 5/2009 |
| WO | WO-2009/065417 A1 | 5/2009 |
| WO | WO-2009/069998 A1 | 6/2009 |
| WO | WO-2009/072387 A1 | 6/2009 |
| WO | WO-2009/073745 A1 | 6/2009 |
| WO | WO-2009/075226 A1 | 6/2009 |
| WO | WO-2009/075434 A1 | 6/2009 |
| WO | WO-2009/075521 A2 | 6/2009 |
| WO | WO-2009/076011 A1 | 6/2009 |
| WO | WO-2009/077873 A2 | 6/2009 |
| WO | WO-2009/081303 A1 | 7/2009 |
| WO | WO-2009/082048 A1 | 7/2009 |
| WO | WO-2009/082742 A1 | 7/2009 |
| WO | WO-2009/083708 A1 | 7/2009 |
| WO | WO-2009/083869 A1 | 7/2009 |
| WO | WO-2009/086252 A1 | 7/2009 |
| WO | WO-2009/088153 A1 | 7/2009 |
| WO | WO-2009/088667 A1 | 7/2009 |
| WO | WO-2009/089203 A1 | 7/2009 |
| WO | WO-2009/089507 A1 | 7/2009 |
| WO | WO-2009/089948 A1 | 7/2009 |
| WO | WO-2009/090426 A2 | 7/2009 |
| WO | WO-2009/091888 A1 | 7/2009 |
| WO | WO-2009/093111 A2 | 7/2009 |
| WO | WO-2009/096734 A1 | 8/2009 |
| WO | WO-2009/097577 A1 | 8/2009 |
| WO | WO-2009/102158 A2 | 8/2009 |
| WO | WO-2009/102654 A1 | 8/2009 |
| WO | WO-2009/110317 A1 | 9/2009 |
| WO | WO-2009/110668 A1 | 9/2009 |
| WO | WO-2009/116793 A2 | 9/2009 |
| WO | WO-2009/117559 A1 | 9/2009 |
| WO | WO-2009/117604 A1 | 9/2009 |
| WO | WO-2009/119494 A1 | 10/2009 |
| WO | WO-2009/120231 A1 | 10/2009 |
| WO | WO-2009/120232 A1 | 10/2009 |
| WO | WO-2009/131047 A1 | 10/2009 |
| WO | WO-2009/131381 A2 | 10/2009 |
| WO | WO-2009/131652 A1 | 10/2009 |

(56) References Cited

FOREIGN PATENT DOCUMENTS

| | | |
|---|---|---|
| WO | WO-2009/132356 A1 | 10/2009 |
| WO | WO-2009/134068 A1 | 11/2009 |
| WO | WO-2009/143121 A1 | 11/2009 |
| WO | WO-2009/144849 A1 | 12/2009 |
| WO | WO-2009/146781 A2 | 12/2009 |
| WO | WO-2009/148273 A2 | 12/2009 |
| WO | WO-2009/149922 A1 | 12/2009 |
| WO | WO-2009/150394 A2 | 12/2009 |
| WO | WO-2009/151195 A1 | 12/2009 |
| WO | WO-2009/151778 A2 | 12/2009 |
| WO | WO-2009/152137 A1 | 12/2009 |
| WO | WO-2010/007621 A1 | 1/2010 |
| WO | WO-2010/008620 A1 | 1/2010 |
| WO | WO-2010/013212 A1 | 2/2010 |
| WO | WO-2010/013872 A1 | 2/2010 |
| WO | WO-2010/014436 A1 | 2/2010 |
| WO | WO-2010/017125 A1 | 2/2010 |
| WO | WO-2010/018587 A1 | 2/2010 |
| WO | WO-2010/026939 A1 | 3/2010 |
| WO | WO-2010/029502 A1 | 3/2010 |
| WO | WO-2010/030260 A1 | 3/2010 |
| WO | WO-2010/031142 A1 | 3/2010 |
| WO | WO-2010/042808 A1 | 4/2010 |
| WO | WO-2010/042849 A1 | 4/2010 |
| WO | WO-2010/049948 A2 | 5/2010 |
| WO | WO-2010/050536 A1 | 5/2010 |
| WO | WO-2010/051564 A1 | 5/2010 |
| WO | WO-2010/052149 A2 | 5/2010 |
| WO | WO-2010/054369 A1 | 5/2010 |
| WO | WO-2010/056287 A1 | 5/2010 |
| WO | WO-2010/067205 A2 | 6/2010 |
| WO | WO-2010/067947 A1 | 6/2010 |
| WO | WO-2010/068407 A2 | 6/2010 |
| WO | WO-2010/068678 A1 | 6/2010 |
| WO | WO-2010/070451 A1 | 6/2010 |
| WO | WO-2010/075184 A1 | 7/2010 |
| WO | WO-2010/079003 A1 | 7/2010 |
| WO | WO-2010/080468 A1 | 7/2010 |
| WO | WO-2010/087764 A1 | 8/2010 |
| WO | WO-2010/089673 A2 | 8/2010 |
| WO | WO-2010/093138 A2 | 8/2010 |
| WO | WO-2010/093591 A1 | 8/2010 |
| WO | WO-2010/098727 A1 | 9/2010 |
| WO | WO-2010/098810 A1 | 9/2010 |
| WO | WO-2010/106537 A2 | 9/2010 |
| WO | WO-2010/106554 A2 | 9/2010 |
| WO | WO-2010/112674 A1 | 10/2010 |
| WO | WO-2010/119552 A1 | 10/2010 |
| WO | WO-2010/119553 A1 | 10/2010 |
| WO | WO-2010/123193 A1 | 10/2010 |
| WO | WO-2010/123767 A1 | 10/2010 |
| WO | WO-2010/124390 A1 | 11/2010 |
| WO | WO-2010/134826 A1 | 11/2010 |
| WO | WO-2010/135890 A1 | 12/2010 |
| WO | WO-2010/136230 A1 | 12/2010 |
| WO | WO-2010/138611 A1 | 12/2010 |
| WO | WO-2010/140300 A1 | 12/2010 |
| WO | WO-2010/141451 A1 | 12/2010 |
| WO | WO-2010/141689 A2 | 12/2010 |
| WO | WO-2010/141939 A1 | 12/2010 |
| WO | WO-2010/148996 A1 | 12/2010 |
| WO | WO-2011/000115 A1 | 1/2011 |
| WO | WO-2011/001384 A2 | 1/2011 |
| WO | WO-2011/009767 A2 | 1/2011 |
| WO | WO-2011/009768 A2 | 1/2011 |
| WO | WO-2011/010646 A1 | 1/2011 |
| WO | WO-2011/010797 A2 | 1/2011 |
| WO | WO-2011/010894 A2 | 1/2011 |
| WO | WO-2011/010970 A1 | 1/2011 |
| WO | WO-2011/016048 A2 | 2/2011 |
| WO | WO-2011/016978 A1 | 2/2011 |
| WO | WO-2011/017279 A1 | 2/2011 |
| WO | WO-2011/025843 A1 | 3/2011 |
| WO | WO-2011/028237 A1 | 3/2011 |
| WO | WO-2011/031095 A2 | 3/2011 |
| WO | WO-2011/034448 A1 | 3/2011 |
| WO | WO-2011/035329 A2 | 3/2011 |
| WO | WO-2011/037736 A2 | 3/2011 |
| WO | WO-2011/039398 A1 | 4/2011 |
| WO | WO-2011/044383 A1 | 4/2011 |
| WO | WO-2011/044529 A1 | 4/2011 |
| WO | WO-2011/046631 A1 | 4/2011 |
| WO | WO-2011/047237 A2 | 4/2011 |
| WO | WO-2011/054643 A1 | 5/2011 |
| WO | WO-2011/063022 A2 | 5/2011 |
| WO | WO-2011/063686 A1 | 6/2011 |
| WO | WO-2011/065785 A2 | 6/2011 |
| WO | WO-2011/066215 A1 | 6/2011 |
| WO | WO-2011/071401 A1 | 6/2011 |
| WO | WO-2011/072231 A2 | 6/2011 |
| WO | WO-2011/078603 A2 | 6/2011 |
| WO | WO-2011/084435 A2 | 7/2011 |
| WO | WO-2011/086496 A2 | 7/2011 |
| WO | WO-2011/087447 A1 | 7/2011 |
| WO | WO-2011/088182 A1 | 7/2011 |
| WO | WO-2011/089321 A1 | 7/2011 |
| WO | WO-2011/089423 A2 | 7/2011 |
| WO | WO-2011/089452 A1 | 7/2011 |
| WO | WO-2011/092426 A1 | 8/2011 |
| WO | WO-2011/092727 A1 | 8/2011 |
| WO | WO-2011/093619 A2 | 8/2011 |
| WO | WO-2011/093937 A2 | 8/2011 |
| WO | WO-2011/094384 A1 | 8/2011 |
| WO | WO-2011/095873 A1 | 8/2011 |
| WO | WO-2011/097454 A2 | 8/2011 |
| WO | WO-2011/099838 A1 | 8/2011 |
| WO | WO-2011/100356 A1 | 8/2011 |
| WO | WO-2011/104727 A2 | 9/2011 |
| WO | WO-2011/106253 A2 | 9/2011 |
| WO | WO-2011/106254 A1 | 9/2011 |
| WO | WO-2011/109419 A2 | 9/2011 |
| WO | WO-2011/111011 A1 | 9/2011 |
| WO | WO-2011/112702 A2 | 9/2011 |
| WO | WO-2011/120074 A1 | 10/2011 |
| WO | WO-2011/124753 A1 | 10/2011 |
| WO | WO-2011/132123 A1 | 10/2011 |
| WO | WO-2011/132190 A2 | 10/2011 |
| WO | WO-2011/139941 A1 | 11/2011 |
| WO | WO-2011/140568 A2 | 11/2011 |
| WO | WO-2011/141575 A1 | 11/2011 |
| WO | WO-2011/146492 A2 | 11/2011 |
| WO | WO-2011/149765 A2 | 12/2011 |
| WO | WO-2011/158253 A2 | 12/2011 |
| WO | WO-2011/161698 A1 | 12/2011 |
| WO | WO-2011/163279 A2 | 12/2011 |
| WO | WO-2012/009692 A2 | 1/2012 |
| WO | WO-2012/009694 A2 | 1/2012 |
| WO | WO-2012/011979 A1 | 1/2012 |
| WO | WO-2012/012846 A1 | 2/2012 |
| WO | WO-2012/019397 A1 | 2/2012 |
| WO | WO-2012/023958 A1 | 2/2012 |
| WO | WO-2012/025675 A1 | 3/2012 |
| WO | WO-2012/027895 A1 | 3/2012 |
| WO | WO-2012/031303 A2 | 3/2012 |
| WO | WO-2012/035306 A1 | 3/2012 |
| WO | WO-2012/035805 A1 | 3/2012 |
| WO | WO-2012/036567 A1 | 3/2012 |
| WO | WO-2012/037350 A1 | 3/2012 |
| WO | WO-2012/038449 A2 | 3/2012 |
| WO | WO-2012/043963 A1 | 4/2012 |
| WO | WO-2012/044422 A1 | 4/2012 |
| WO | WO-2012/047708 A2 | 4/2012 |
| WO | WO-2012/047987 A1 | 4/2012 |
| WO | WO-2012/048001 A2 | 4/2012 |
| WO | WO-2012/050954 A1 | 4/2012 |
| WO | WO-2012/053716 A1 | 4/2012 |
| WO | WO-2012/054673 A1 | 4/2012 |
| WO | WO-2012/067487 A1 | 5/2012 |
| WO | WO-2012/067790 A1 | 5/2012 |
| WO | WO-2012/070019 A2 | 5/2012 |
| WO | WO-2012/071132 A1 | 5/2012 |
| WO | WO-2012/080524 A1 | 6/2012 |
| WO | WO-2012/086412 A1 | 6/2012 |
| WO | WO-2012/088246 A1 | 6/2012 |

(56) References Cited

FOREIGN PATENT DOCUMENTS

| | | |
|---|---|---|
| WO | WO-2012/092100 A1 | 7/2012 |
| WO | WO-2012/092101 A1 | 7/2012 |
| WO | WO-2012/093744 A1 | 7/2012 |
| WO | WO-2012/093780 A2 | 7/2012 |
| WO | WO-2012/093801 A2 | 7/2012 |
| WO | WO-2012/094753 A1 | 7/2012 |
| WO | WO-2012/100009 A1 | 7/2012 |
| WO | WO-2012/100231 A2 | 7/2012 |
| WO | WO-2012/100232 A2 | 7/2012 |
| WO | WO-2012/100237 A2 | 7/2012 |
| WO | WO-2012/102600 A1 | 8/2012 |
| WO | WO-2012/102608 A1 | 8/2012 |
| WO | WO-2012/106656 A1 | 8/2012 |
| WO | WO-2012/119434 A1 | 9/2012 |
| WO | WO-2012/126332 A1 | 9/2012 |
| WO | WO-2012/128976 A2 | 9/2012 |
| WO | WO-2012/129178 A2 | 9/2012 |
| WO | WO-2012/129368 A1 | 9/2012 |
| WO | WO-2012/131461 A1 | 10/2012 |
| WO | WO-2012/131930 A1 | 10/2012 |
| WO | WO-2012/134739 A1 | 10/2012 |
| WO | WO-2012/135346 A1 | 10/2012 |
| WO | WO-2012/135867 A1 | 10/2012 |
| WO | WO-2012/143743 A1 | 10/2012 |
| WO | WO-2012/143744 A1 | 10/2012 |
| WO | WO-2012/149828 A1 | 11/2012 |
| WO | WO-2012/151180 A1 | 11/2012 |
| WO | WO-2012/153351 A2 | 11/2012 |
| WO | WO-2012/154091 A1 | 11/2012 |
| WO | WO-2012/154968 A2 | 11/2012 |
| WO | WO-2012/158806 A2 | 11/2012 |
| WO | WO-2012/160421 A1 | 11/2012 |
| WO | WO-2012/166592 A2 | 12/2012 |
| WO | WO-2012/167941 A1 | 12/2012 |
| WO | WO-2013/001133 A1 | 1/2013 |
| WO | WO-2013/003611 A2 | 1/2013 |
| WO | WO-2013/003865 A1 | 1/2013 |
| WO | WO-2013/008886 A1 | 1/2013 |
| WO | WO-2013/009445 A1 | 1/2013 |
| WO | WO-2013/020172 A1 | 2/2013 |
| WO | WO-2013/022580 A1 | 2/2013 |
| WO | WO-2013/023892 A1 | 2/2013 |
| WO | WO-2013/025161 A2 | 2/2013 |
| WO | WO-2013/028380 A1 | 2/2013 |
| WO | WO-2013/028920 A2 | 2/2013 |
| WO | WO-2013/032070 A1 | 3/2013 |
| WO | WO-2013/032697 A2 | 3/2013 |
| WO | WO-2013/033164 A1 | 3/2013 |
| WO | WO-2013/033522 A1 | 3/2013 |
| WO | WO-2013/037057 A1 | 3/2013 |
| WO | WO-2013/040713 A2 | 3/2013 |
| WO | WO-2013/051029 A1 | 4/2013 |
| WO | WO-2013/051030 A1 | 4/2013 |
| WO | WO-2013/051031 A1 | 4/2013 |
| WO | WO-2013/051032 A1 | 4/2013 |
| WO | WO-2013/051841 A2 | 4/2013 |
| WO | WO-2013/052459 A1 | 4/2013 |
| WO | WO-2013/052900 A1 | 4/2013 |
| WO | WO-2013/059561 A1 | 4/2013 |
| WO | WO-2013/059839 A2 | 4/2013 |
| WO | WO-2013/061150 A1 | 5/2013 |
| WO | WO-2013/061184 A1 | 5/2013 |
| WO | WO-2013/061335 A2 | 5/2013 |
| WO | WO-2013/061592 A1 | 5/2013 |
| WO | WO-2013/062459 A2 | 5/2013 |
| WO | WO-2013/066846 A1 | 5/2013 |
| WO | WO-2013/067273 A2 | 5/2013 |
| WO | WO-2013/070747 A1 | 5/2013 |
| WO | WO-2013/071831 A1 | 5/2013 |
| WO | WO-2013/072437 A1 | 5/2013 |
| WO | WO-2013/072944 A1 | 5/2013 |
| WO | WO-2013/074258 A1 | 5/2013 |
| WO | WO-2013/074482 A1 | 5/2013 |
| WO | WO-2013/076731 A2 | 5/2013 |
| WO | WO-2013/078427 A1 | 5/2013 |
| WO | WO-2013/082392 A1 | 6/2013 |
| WO | WO-2013/085470 A1 | 6/2013 |
| WO | WO-2013/086017 A1 | 6/2013 |
| WO | WO-2013/086307 A1 | 6/2013 |
| WO | WO-2013/089919 A2 | 6/2013 |
| WO | WO-2013/093373 A1 | 6/2013 |
| WO | WO-2013/095414 A1 | 6/2013 |
| WO | WO-2013/096037 A1 | 6/2013 |
| WO | WO-2013/101418 A1 | 7/2013 |
| WO | WO-2013/109322 A1 | 7/2013 |
| WO | WO-2013/113065 A1 | 8/2013 |
| WO | WO-2013/114415 A1 | 8/2013 |
| WO | WO-2013/115472 A1 | 8/2013 |
| WO | WO-2013/115665 A1 | 8/2013 |
| WO | WO-2013/115700 A2 | 8/2013 |
| WO | WO-2013/115703 A2 | 8/2013 |
| WO | WO-2013/116414 A1 | 8/2013 |
| WO | WO-2013/116417 A1 | 8/2013 |
| WO | WO-2013/116418 A1 | 8/2013 |
| WO | WO-2013/120209 A1 | 8/2013 |
| WO | WO-2013/121282 A1 | 8/2013 |
| WO | WO-2013/121356 A2 | 8/2013 |
| WO | WO-2013/121564 A1 | 8/2013 |
| WO | WO-2013/124276 A1 | 8/2013 |
| WO | WO-2013/126391 A1 | 8/2013 |
| WO | WO-2013/126675 A2 | 8/2013 |
| WO | WO-2013/128435 A1 | 9/2013 |
| WO | WO-2013/130542 A1 | 9/2013 |
| WO | WO-2013/131134 A2 | 9/2013 |
| WO | WO-2013/135337 A1 | 9/2013 |
| WO | WO-2013/142209 A1 | 9/2013 |
| WO | WO-2013/148488 A1 | 10/2013 |
| WO | WO-2013/150727 A1 | 10/2013 |
| WO | WO-2013/157017 A1 | 10/2013 |
| WO | WO-2013/159110 A1 | 10/2013 |
| WO | WO-2013/163809 A1 | 11/2013 |
| WO | WO-2013/165028 A2 | 11/2013 |
| WO | WO-2013/169441 A1 | 11/2013 |
| WO | WO-2013/169786 A2 | 11/2013 |
| WO | WO-2013/170320 A1 | 11/2013 |
| WO | WO-2013/172502 A1 | 11/2013 |
| WO | WO-2013/173122 A1 | 11/2013 |
| WO | WO-2013/177509 A1 | 11/2013 |
| WO | WO-2013/185509 A1 | 12/2013 |
| WO | WO-2013/187790 A1 | 12/2013 |
| WO | WO-2013/188599 A2 | 12/2013 |
| WO | WO-2013/189284 A1 | 12/2013 |
| WO | WO-2013/190784 A1 | 12/2013 |
| WO | WO-2013/192033 A1 | 12/2013 |
| WO | WO-2014/008040 A1 | 1/2014 |
| WO | WO-2014/009489 A2 | 1/2014 |
| WO | WO-2014/012037 A1 | 1/2014 |
| WO | WO-2014/016609 A1 | 1/2014 |
| WO | WO-2014/017738 A1 | 1/2014 |
| WO | WO-2014/022375 A1 | 2/2014 |
| WO | WO-2014/022731 A2 | 2/2014 |
| WO | WO-2014/030706 A1 | 2/2014 |
| WO | WO-2014/033295 A1 | 3/2014 |
| WO | WO-2014/041567 A2 | 3/2014 |
| WO | WO-2014/042687 A1 | 3/2014 |
| WO | WO-2014/043748 A1 | 3/2014 |
| WO | WO-2014/045236 A2 | 3/2014 |
| WO | WO-2014/055356 A1 | 4/2014 |
| WO | WO-2014/058672 A1 | 4/2014 |
| WO | WO-2014/058811 A1 | 4/2014 |
| WO | WO-2014/061032 A1 | 4/2014 |
| WO | WO-2014/062861 A1 | 4/2014 |
| WO | WO-2014/066958 A2 | 5/2014 |
| WO | WO-2014/071337 A1 | 5/2014 |
| WO | WO-2014/072725 A1 | 5/2014 |
| WO | WO-2014/076711 A2 | 5/2014 |
| WO | WO-2014/078860 A1 | 5/2014 |
| WO | WO-2014/080214 A1 | 5/2014 |
| WO | WO-2014/084708 A1 | 6/2014 |
| WO | WO-2014/085617 A1 | 6/2014 |
| WO | WO-2014/085638 A1 | 6/2014 |
| WO | WO-2014/086422 A1 | 6/2014 |
| WO | WO-2014/091252 A1 | 6/2014 |
| WO | WO-2014/092988 A2 | 6/2014 |

(56) References Cited

FOREIGN PATENT DOCUMENTS

| | | |
|---|---|---|
| WO | WO-2014/093680 A2 | 6/2014 |
| WO | WO-2014/093963 A1 | 6/2014 |
| WO | WO-2014/104971 A1 | 7/2014 |
| WO | WO-2014/105994 A2 | 7/2014 |
| WO | WO-2014/106546 A1 | 7/2014 |
| WO | WO-2014/107267 A1 | 7/2014 |
| WO | WO-2014/118727 A1 | 8/2014 |
| WO | WO-2014/128711 A1 | 8/2014 |
| WO | WO-2014/130368 A1 | 8/2014 |
| WO | WO-2014/132255 A1 | 9/2014 |
| WO | WO-2014/134686 A1 | 9/2014 |
| WO | WO-2014/134827 A1 | 9/2014 |
| WO | WO-2014/136338 A1 | 9/2014 |
| WO | WO-2014/140807 A2 | 9/2014 |
| WO | WO-2014/140814 A2 | 9/2014 |
| WO | WO-2014/140818 A2 | 9/2014 |
| WO | WO-2014/143030 A1 | 9/2014 |
| WO | WO-2014/145359 A1 | 9/2014 |
| WO | WO-2014/146132 A2 | 9/2014 |
| WO | WO-2014/149990 A1 | 9/2014 |
| WO | WO-2014/150531 A1 | 9/2014 |
| WO | WO-2014/151071 A1 | 9/2014 |
| WO | WO-2014/151935 A2 | 9/2014 |
| WO | WO-2014/155204 A1 | 10/2014 |
| WO | WO-2014/155319 A1 | 10/2014 |
| WO | WO-2014/158596 A1 | 10/2014 |
| WO | WO-2014/159899 A2 | 10/2014 |
| WO | WO-2014/160347 A2 | 10/2014 |
| WO | WO-2014/161071 A1 | 10/2014 |
| WO | WO-2014/162516 A1 | 10/2014 |
| WO | WO-2014/165145 A1 | 10/2014 |
| WO | WO-2014/167309 A1 | 10/2014 |
| WO | WO-2014/169290 A1 | 10/2014 |
| WO | WO-2014/179410 A2 | 11/2014 |
| WO | WO-2014/181334 A1 | 11/2014 |
| WO | WO-2014/182085 A1 | 11/2014 |
| WO | WO-2014/182701 A1 | 11/2014 |
| WO | WO-2014/185640 A1 | 11/2014 |
| WO | WO-2014/188352 A1 | 11/2014 |
| WO | WO-2014/190058 A1 | 11/2014 |
| WO | WO-2014/192216 A1 | 12/2014 |
| WO | WO-2014/199136 A1 | 12/2014 |
| WO | WO-2014/199138 A1 | 12/2014 |
| WO | WO-2014/200667 A1 | 12/2014 |
| WO | WO-2014/201585 A1 | 12/2014 |
| WO | WO-2014/201995 A1 | 12/2014 |
| WO | WO-2014/203041 A1 | 12/2014 |
| WO | WO-2014/204857 A1 | 12/2014 |
| WO | WO-2014/205174 A1 | 12/2014 |
| WO | WO-2015/002368 A1 | 1/2015 |
| WO | WO-2015/004477 A1 | 1/2015 |
| WO | WO-2015/006212 A2 | 1/2015 |
| WO | WO-2015/008156 A2 | 1/2015 |
| WO | WO-2015/008910 A1 | 1/2015 |
| WO | WO-2015/009900 A1 | 1/2015 |
| WO | WO-2015/012417 A1 | 1/2015 |
| WO | WO-2015/023805 A1 | 2/2015 |
| WO | WO-2015/026401 A1 | 2/2015 |
| WO | WO-2015/033248 A1 | 3/2015 |
| WO | WO-2015/041643 A1 | 3/2015 |
| WO | WO-2015/042668 A2 | 4/2015 |
| WO | WO-2015/044677 A1 | 4/2015 |
| WO | WO-2015/054086 A1 | 4/2015 |
| WO | WO-2015/054188 A1 | 4/2015 |
| WO | WO-2015/057344 A1 | 4/2015 |
| WO | WO-2015/057542 A1 | 4/2015 |
| WO | WO-2015/057956 A1 | 4/2015 |
| WO | WO-2015/061590 A1 | 4/2015 |
| WO | WO-2015/068303 A1 | 5/2015 |
| WO | WO-2015/068304 A1 | 5/2015 |
| WO | WO-2015/070055 A2 | 5/2015 |
| WO | WO-2015/076803 A1 | 5/2015 |
| WO | WO-2015/077829 A1 | 6/2015 |
| WO | WO-2015/084066 A1 | 6/2015 |
| WO | WO-2015/090326 A1 | 6/2015 |
| WO | WO-2015/094143 A1 | 6/2015 |
| WO | WO-2015/094190 A1 | 6/2015 |
| WO | WO-2015/102857 A1 | 7/2015 |
| WO | WO-2015/111910 A1 | 7/2015 |
| WO | WO-2015/114215 A1 | 8/2015 |
| WO | WO-2015/115752 A1 | 8/2015 |
| WO | WO-2015/117212 A1 | 8/2015 |
| WO | WO-2015/118519 A1 | 8/2015 |
| WO | WO-2015/125174 A1 | 8/2015 |
| WO | WO-2015/125175 A1 | 8/2015 |
| WO | WO-2015/128645 A1 | 9/2015 |
| WO | WO-2015/132552 A1 | 9/2015 |
| WO | WO-2015/137490 A1 | 9/2015 |
| WO | WO-2015/138431 A2 | 9/2015 |
| WO | WO-2015/139110 A1 | 9/2015 |
| WO | WO-2015/139378 A1 | 9/2015 |
| WO | WO-2015/140643 A2 | 9/2015 |
| WO | WO-2015/143709 A1 | 10/2015 |
| WO | WO-2015/153852 A1 | 10/2015 |
| WO | WO-2015/154482 A1 | 10/2015 |
| WO | WO-2015/160505 A1 | 10/2015 |
| WO | WO-2015/171961 A1 | 11/2015 |
| WO | WO-2015/173789 A1 | 11/2015 |
| WO | WO-2015/175454 A1 | 11/2015 |
| WO | WO-2015/177490 A1 | 11/2015 |
| WO | WO-2015/183997 A1 | 12/2015 |
| WO | WO-2015/184449 A1 | 12/2015 |
| WO | WO-2015/187005 A1 | 12/2015 |
| WO | WO-2015/192066 A1 | 12/2015 |
| WO | WO-2015/193913 A1 | 12/2015 |
| WO | WO-2015/194911 A1 | 12/2015 |
| WO | WO-2015/200393 A1 | 12/2015 |
| WO | WO-2015/200546 A1 | 12/2015 |
| WO | WO-2016/013028 A1 | 1/2016 |
| WO | WO-2016/014751 A1 | 1/2016 |
| WO | WO-2016/016986 A1 | 2/2016 |
| WO | WO-2016/019456 A1 | 2/2016 |
| WO | WO-2016/022832 A1 | 2/2016 |
| WO | WO-2016/027115 A1 | 2/2016 |
| WO | WO-2016/029721 A1 | 3/2016 |
| WO | WO-2016/034430 A1 | 3/2016 |
| WO | WO-2016/034772 A1 | 3/2016 |
| WO | WO-2016/034773 A1 | 3/2016 |
| WO | WO-2016/035012 A1 | 3/2016 |
| WO | WO-2016/040593 A1 | 3/2016 |
| WO | WO-2016/044442 A1 | 3/2016 |
| WO | WO-2016/046167 A1 | 3/2016 |
| WO | WO-2016/049844 A1 | 4/2016 |
| WO | WO-2016/049848 A1 | 4/2016 |
| WO | WO-2016/050054 A1 | 4/2016 |
| WO | WO-2016/050986 A1 | 4/2016 |
| WO | WO-2016/054258 A1 | 4/2016 |
| WO | WO-2016/054636 A1 | 4/2016 |
| WO | WO-2016/059486 A1 | 4/2016 |
| WO | WO-2016/061152 A1 | 4/2016 |
| WO | WO-2016/066168 A1 | 5/2016 |
| WO | WO-2016/070019 A2 | 5/2016 |
| WO | WO-2016/077333 A1 | 5/2016 |
| WO | WO-2016/079554 A1 | 5/2016 |
| WO | WO-2016/081684 A1 | 5/2016 |
| WO | WO-2016/087221 A1 | 6/2016 |
| WO | WO-2016/090073 A1 | 6/2016 |
| WO | WO-2016/091394 A1 | 6/2016 |
| WO | WO-2016/094886 A2 | 6/2016 |
| WO | WO-2016/103109 A1 | 6/2016 |
| WO | WO-2016/109229 A1 | 7/2016 |
| WO | WO-2016/109626 A1 | 7/2016 |
| WO | WO-2016/114987 A1 | 7/2016 |
| WO | WO-2016/116801 A1 | 7/2016 |
| WO | WO-2016/116923 A1 | 7/2016 |
| WO | WO-2016/126244 A1 | 8/2016 |
| WO | WO-2017/030809 A1 | 2/2017 |
| WO | WO-2019046274 A1 * | 3/2019 ............. B01D 17/10 |
| WO | WO-2019090319 A1 * | 5/2019 ............. F01M 11/10 |

(56) References Cited

OTHER PUBLICATIONS

First Office Action issued for Chinese Patent Application No. CN 201880014369.4, dated Dec. 22, 2020, 9 pages.
Second Office Action issued for Chinese Patent Application No. 201880014369.4 dated Aug. 10, 2021, 9 pages.

* cited by examiner

GENUINE FILTER RECOGNITION WITH FILTER MONITORING SYSTEM

CROSS-REFERENCE TO RELATED APPLICATIONS

This application is a national stage of PCT Application No. PCT/US2018/021129, filed Mar. 6, 2018 which claims priority to U.S. Provisional Patent Application No. 62/467,348, filed on Mar. 6, 2017. The contents of both applications are incorporated herein by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, fluids such as fuel, oil, and air are typically passed through filter elements to remove contaminants (e.g., particulates, dust, water, etc.) from the fluids prior to delivery to the engine. The filter elements require periodic replacement as the filter media of the filter elements captures and removes the contaminants from the fluids passing through the filter media. In some instances, the filter element may be replaced with a non-genuine or a non-authorized replacement filter element. Often times, the system operator and/or the service technician may not know that a non-genuine or non-authorized replacement filter element has been installed due to advanced counterfeiting techniques. In these instances, the non-authorized replacement filter element may not conform to original manufacturer performance and safety parameters. Accordingly, the non-authorized replacement filter element may allow more contaminants to pass through the filtration system thereby damaging the downstream components (e.g., the internal combustion engine, pumps, turbochargers, etc.).

SUMMARY

Various example embodiments relate to systems and methods for verifying a filter element that has been installed in a filtration system as being a genuine (i.e., authentic or manufacturer approved) filter element. One such embodiment relates to a method. The method includes receiving, by an authentication system, filter element tag information from a tag associated with a filter element installed in a filtration system. The method further includes comparing, by the authentication system, the filter element tag information with verified genuine filter element information to determine whether the filter element installed in the filtration system is a genuine filter element. In some arrangements, the method includes recording, by the authentication system, the filter element tag information in a filter element database.

Another such embodiment relates to a filter authentication system. The system comprises a memory structured to store instructions, a processor structured to execute the instructions stored in the memory, and a storage device structured to store a filter element database. The stored instructions, when executed by the processor, cause the filter authentication system to perform operations comprising receiving filter element tag information from a tag associated with a filter element installed in a filtration system and comparing the filter element tag information with verified genuine filter element information stored in the filter element database to determine whether the filter element installed in the filtration system is a genuine filter element. In some arrangements, the stored instructions, when executed by the processor, cause the filter authentication system to perform operations comprising recording, by the authentication system, the filter element tag information in the filter element database.

In some arrangements, the stored instructions further cause the filter authentication system to perform operations comprising determining that the filter element is selected from a group containing (1) a genuine filter element and (2) a non-genuine filter element. In some arrangements, the system further comprises a filter verification circuit structured to decrypt the received filter element tag information received from the tag and use the decrypted information to verify the filter element by comparing the decrypted filter element tag information with the verified genuine filter element information and a network interface structured to transmit a confirmation message to a filter monitoring system associated with the filtration system. In some arrangements, the stored instructions further cause the filter authentication system to perform operations comprising transmitting, via the network interface a non-genuine alert to a filter monitoring system associated with the filtration system consequent to determining that the filter element is a non-genuine filter element. The stored instructions may further cause the filter authentication system to perform operations comprising transmitting, to the filter monitoring system via the network interface, an instruction to perform a preventative action, in response to determining that the filter element is a non-genuine filter element. The instruction to perform a preventative action may cause an internal combustion engine associated with the filtration system to turn off, not start, record a fault code, or derate. In some arrangements, the stored instructions further cause the filter authentication system to perform operations comprising transmitting a confirmation message to a filter monitoring system associated with the filtration system.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, systems and methods for determining whether an authorized or genuine filter element is installed in a filtration system are described. In some arrangements, a filter monitoring system provides feedback as to whether a genuine (i.e., authorized, OEM approved, etc.) or an unauthorized filter element is installed in a given filtration system. The authorized filter determination may be based on radio frequency identification ("RFID") technology. For example, each authorized filter cartridge may be assembled with an RFID tag, which is programmed with a unique code. In some arrangements, the unique code is specific to a given filter element. In other arrangements, the unique code is specific to a class of filter elements (e.g., all filter elements having the same model number). RFID readers with antennas in the monitored filter systems read the RFID tag information from the installed filter elements and feed any detected information into the filter monitoring system. The filter monitoring system or a remote diagnostic system analyzes the returned data (or absence thereof) to determine if a genuine (i.e., authorized, OEM approved, etc.) filter element is installed or not. In some other arrangements, a code (e.g., barcode, two-dimensional barcode, holographic code, RFID tag, etc.) on the filter element or packaging is scanned via a computing device by a technician installing the filter element in a filtration system. The information gathered from the code is then transmitted by the computing device to a remote diagnostic system to determine if a genuine (i.e., authorized, OEM approved, etc.) filter element is installed or not. The two described systems (i.e., filter monitoring system and remote diagnostic system) may be used as stand-alone systems or as complimentary systems at the same time (e.g., to provide a two-factor authentication of an installed filter element).

Figure 1:
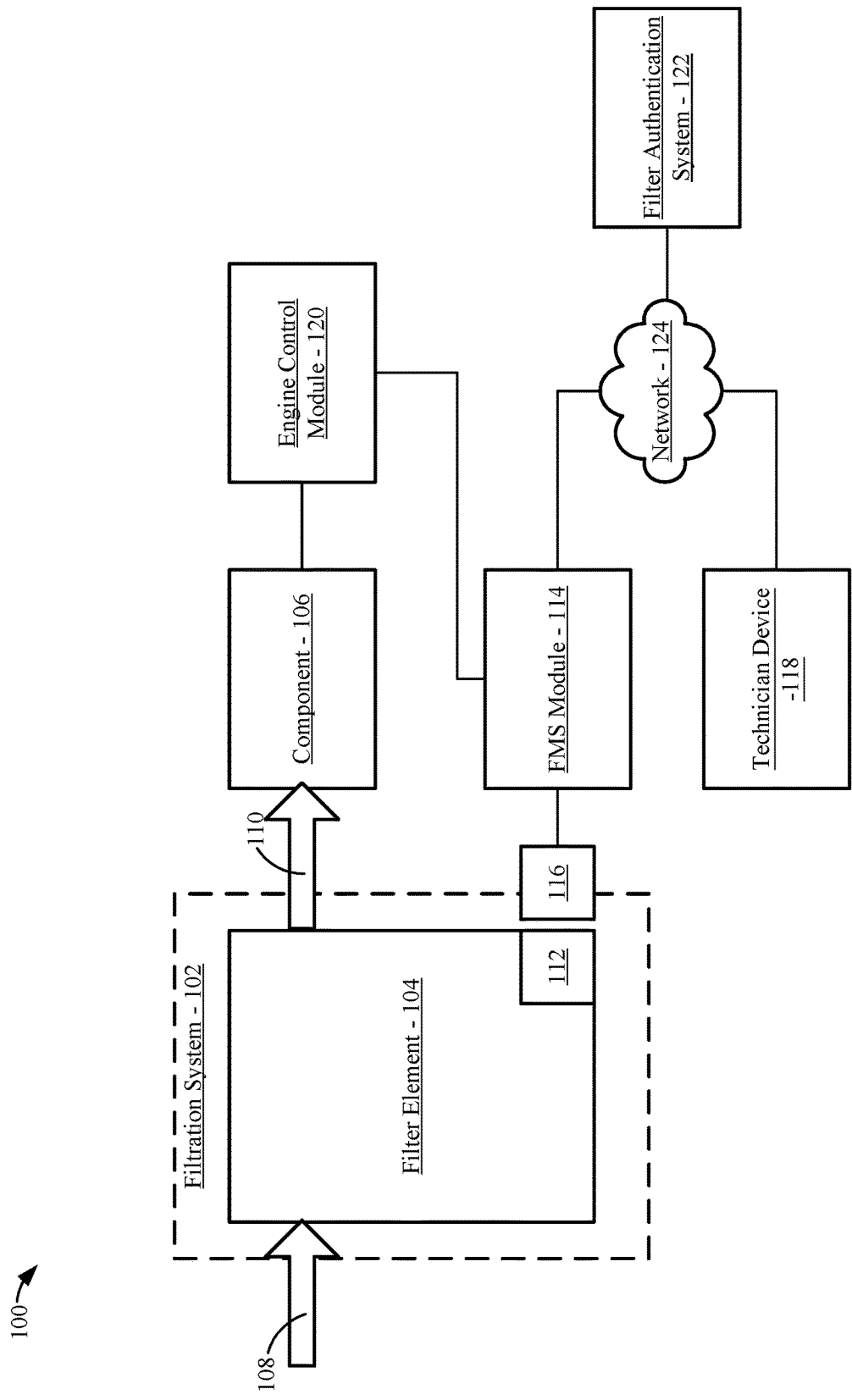
FIG. 1 shows a schematic view of a system according to an example embodiment.

Referring to FIG. 1, a system 100 is shown according to an example embodiment. As shown in FIG. 1, the system 100 includes a filtration system 102 having a filter element 104 installed in the filtration system 102. The filtration system 102 filters a fluid via the filter element 104 and provides the filtered fluid to a component 106 (e.g., an internal combustion engine, a pump, etc.). For example, the filtration system 102 may be an air filter system that filters intake air for an internal combustion engine (e.g., a diesel internal combustion engine). Accordingly, the filtration system 102 includes a fluid inlet 108 that provides fluid to be filtered to the filter element 104, and a fluid outlet 110 that provides filtered fluid to the downstream component 106. Although shown as including one filtration system 102, it should be understood that system 100 can include any number of filtration systems 102. For example, the system 100 can include any combination of an air filtration system, a fuel filtration system, a lubricant filtration system, a fuel-water separator, a hydraulic fluid filtration system, or the like.

The filter element 104 generally includes filter media and at least one frame member. In arrangements where the filter element 104 is a cylindrical filter element, the frame member may include at least one of a first endcap and a second endcap that are secured to the filter media. The filter element 104 can be a spin-on filter. As described in further detail below, the filter element 104 is a genuine (i.e., authorized) filter element. As used herein, the terms "genuine" and "authorized" are used to describe filter elements that are approved by the manufacturer and/or operator of the filtration system 102 for use within the filtration system 102. Accordingly, the filter element 104 includes at least one tag 112. The tag 112 may be secured to any component of the filter element 104 (e.g., an endcap, the filter media, the frame, etc.) or the packaging of the filter element 104. In some arrangements, the tag can be embedded in the frame member (e.g., embedded in a top or bottom endcap of the filter element). The tag may be a radio-frequency identification tag ("RFID"), a barcode, a two-dimensional barcode (e.g., a QR code), a cryptographic tag, a holographic tag, or a combination thereof. In some arrangements, the filter element 104 may include two tags 112 of the same format (e.g., each of the tags is an RFID tag) or different format (e.g., one tag is an RFID tag while the other tag is a barcode). The tag 112 is encoded with information that is used to verify the filter element 104 as being a genuine filter element. In some arrangements, the information on the tag 112 is read by a filter monitoring system ("FMS") module 114 via a tag reader 116. In some arrangements, the information on the tag 112 is read by an engine control module ("ECM") 120 via a tag reader 116. In some arrangements, the information on the tag 112 is read by a filter authentication system 122 via a tag reader 116. In other arrangements, the information on the tag 112 is read by a technician device 118 (e.g., a smartphone, a tablet computing device, a PDA, a laptop computer, etc.) at the time the filter element 104 is installed in the filtration system 102. In further arrangements, the information on the tag 112 is read by both the FMS module 114 and the technician device 118.

In some arrangements, the FMS module 114 is also structured to monitor the status of the filtration system 102 and the installed filter element 104. For example, the FMS module 114 can monitor sensor feedback information relating to the filtration system 102 (e.g., pressure sensors, temperature sensors, fluid quality sensors, etc.) to determine when the filter element 104 requires replacement. Accordingly, the FMS module 114 may be configured in the same manner as set forth in U.S. patent application Ser. No. 14/977,858, entitled "FILTRATION MONITORING SYSTEMS," filed on Dec. 22, 2015, U.S. Provisional Patent Application No. 62/320,030, entitled "SYSTEM AND METHOD FOR CALCULATING REMAINING USEFUL LIFE AND CURRENT FILTER STATUS FOR FUEL AND LUBE FILTERS," filed on Apr. 8, 2016, and/or U.S. Provisional Patent Application No. 62/357,067, entitled "SYSTEM AND METHOD FOR OUTPUTTING FILTER MONITORING SYSTEM INFORMATION VIA TELEMATICS," filed on Jun. 30, 2016, each of which are herein incorporated by reference in their entireties and for all purposes. In arrangements where the component 106 is an internal combustion engine, the FMS module 114 is structured to communicate information with an engine control module 120 (e.g., via a J1939 vehicle bus data link). The engine control module 120 is structured to control the operation of the internal combustion engine. As such, the FMS module 114 can trigger an alert (e.g., a dashboard warning) to an operator of the internal combustion engine via the engine control module 120 if the filter element 104 is determined to be non-authorized and/or non-genuine. In some arrangements, the FMS module 114 is integrated with the ECM 120.

Both the FMS module 114 and the technician device 118 are configured to provide information gathered from the tag 112 to a filter authentication system 122. The FMS module 114 and the technician device 118 are configured to transmit the information via a network 124 (e.g., the Internet) to the filter authentication system 122. The FMS module 114 and the technician device 118 can communicate data to and from the filter authentication system 122 via the network 124 through any combination of wired data transmission (e.g., Ethernet, USB, etc.) and wireless data transmission (e.g., WiFi, Bluetooth, Zigbee, cellular, etc.) protocols. Accordingly, in some arrangements, the filter authentication system 122 is remote and physically separate from the filtration system 102, the FMS module 114, and/or the component 106 in the sense that data is communicated between the FMS module 114 and the filter authentication system 122 through a network 124 (e.g., an external network, such as the Internet) instead of directly. For example, in arrangements where the filtration system 102 and the FMS module 114 are part of a vehicle powered by an internal combustion engine (i.e., the component 106), the filter authentication system 122 may be part of a remote telematics and diagnostic center (i.e., remote diagnostic system) that is physically separate from the vehicle. In such arrangements, the FMS module 114 can communicate the filter element tag information to the authentication system 122 via a datalink established by a telematics system or a data transceiver (e.g., transceiver 214 discussed below with respect to FIG. 2) over the network 124. The filter authentication system 122 may be affiliated with the manufacturer or operator of the filtration system 102 and/or the filter element 104.

The filter authentication system 122 verifies that the filter element 104 installed in the filtration system 102 is a genuine or authorized filter element by comparing the received information from the tag 112 with known and verified information. Additionally, the filter authentication system 122 can maintain historical information relating to used filter elements. In some arrangements, the FMS module 114 is configured to locally verify that the filter element 104 installed in the filtration system 102 is a genuine or authorized filter element by comparing the received information from the tag 112 with known and verified information.

The components of and the operation of the system 100 is described in further detail below with respect to FIGS. 2 through 6.

Figure 2:
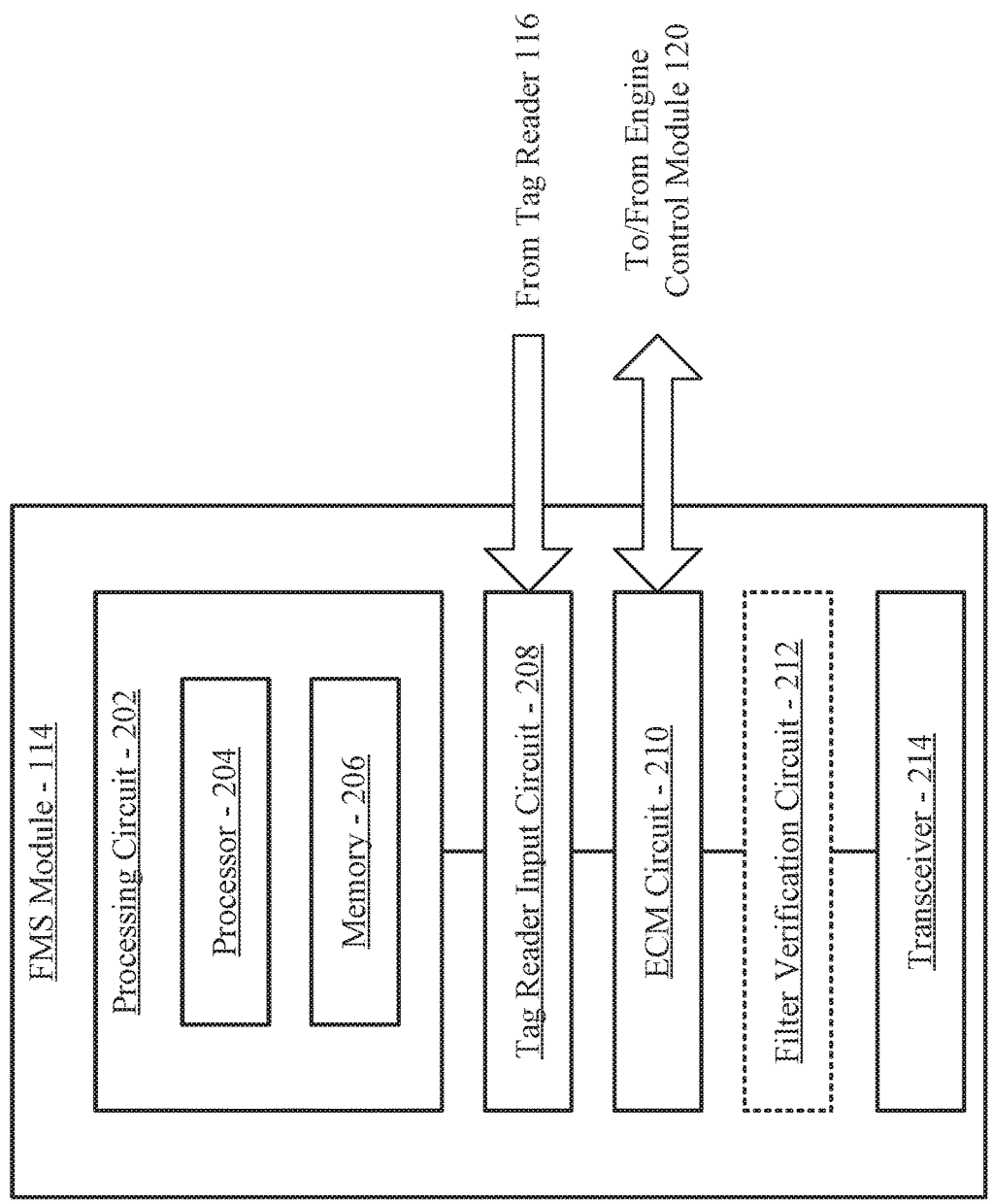
FIG. 2 shows a block diagram of the filter monitoring system module of FIG. 1.

Referring to FIG. 2, a block diagram of the FMS module 114 is shown. The FMS module 114 includes a processing circuit 202. The processing circuit 202 includes a processor 204 and memory 206. The processor 204 may be a general-purpose processor, an application specific integrated circuit (ASIC), a programmable logic controller (PLC) chip, one or more field programmable gate arrays (FPGAs), a digital signal processor (DSP), a group of processing components, or other suitable electronic processing components. The memory 206 may include any of RAM, NVRAM, ROM, Flash Memory, hard disk storage, or the like. The processor 204 is structured to execute instructions stored in the memory 206 that cause the processor 204 to control the operation of the FMS module 114. In some arrangements, the memory 206 may also include one or more storage devices (e.g., hard drives, flash drives, computer readable media, etc.) either local or remote from the FMS module 114. The memory 206 can be configured to store look up tables, algorithms, and/or instructions. Such algorithms can include, for example, filter tag verification algorithms.

The FMS module 114 includes a tag reader input circuit 208, an ECM circuit 210, and a filter verification circuit 212. In some arrangements, each of the tag reader input circuit 208, the ECM circuit 210, and the filter verification circuit 212 are separate from the processing circuit 202 (e.g., as shown in FIG. 2). In other arrangements, the processing circuit 202 includes any or all of the tag reader input circuit 208, the ECM circuit 210, and the filter verification circuit 212.

The tag reader input circuit 208 is structured to receive information from the tag 112 that is read by the tag reader 116. As described in further detail below, the received information is used to verify that the filter element 104 installed in the filtration system 102 is genuine and authorized.

The ECM circuit 210 is structured to communicate information to and from the engine control module 120. Accordingly, through the ECM circuit 210, the internal combustion engine can provide a real-time feedback signal relating to engine operating parameters (e.g., speed, temperature, oil pressure, etc.) to the FMS module 114 via the engine control module 120. The real-time feedback of the engine operating parameters may occur via a datalink (e.g., a CANBUS link, a J1939 vehicle bus data link, etc.) with the engine control module 120 via the ECM circuit 210. Additionally, via the ECM circuit 210, the FMS module 114 can send messages to the engine control module 120 (e.g., to trigger a dashboard warning, to give a fault code, to trigger an alarm, to shut off the internal combustion engine, to not start the internal combustion engine, to derate the internal combustion engine, etc.). In some arrangements, the FMS module 114 is part of or integrated with the engine control module 120. In such arrangements, the ECM circuit 210 may be structured control the operation of the internal combustion engine.

The filter verification circuit 212 is structured to decrypt and/or decode the information received from the tag 112 via the tag reader input circuit 208. The decrypted and/or decoded information is then used to verify that the filter element 104 installed in the filtration system 102 is genuine and authorized (e.g., as described in further detail below with respect to FIG. 6). As discussed above, in some arrangements, the FMS module 114 performs the filter verification locally at the FMS module 114. In other arrangements, the FMS module 114 transmits the tag information to the filter authentication system 122 for filter verification. In such arrangements, the filter verification circuit 212 may be omitted from the FMS module 114.

The FMS module 114 also includes a data transceiver 214. The data transceiver 214 is structured to facilitate data communication over the network 124 to and from the filter authentication system 122. In some arrangements, the data transceiver 214 includes a wireless data transceiver, such as a WiFi data transceiver, a Bluetooth data transceiver, a cellular data transceiver (e.g., a 2G data transceiver, a 3G data transceiver, a 4G data transceiver, etc.). In some arrangements, the data transceiver 214 transmits data via a telematics module of the system 100.

Figure 3:
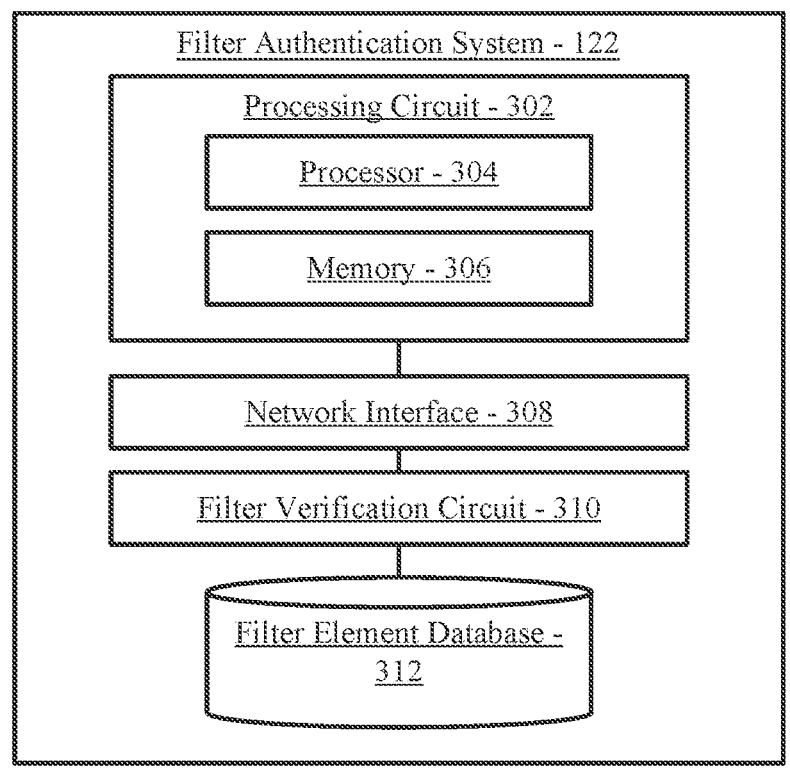
FIG. 3 shows a block diagram of the filter authentication system of FIG. 1.

Referring to FIG. 3, a block diagram of the filter authentication system 122 is shown. As noted above, in some arrangements, the filter authentication system 122 is remote from the FMS module 114, the filtration system 102, and/or the component 106. The filter authentication system 122 includes a processing circuit 302. The processing circuit 302 includes a processor 304 and memory 306. The processor 304 may be a general-purpose processor, an application specific integrated circuit (ASIC), a programmable logic controller (PLC) chip, one or more field programmable gate arrays (FPGAs), a digital signal processor (DSP), a group of processing components, or other suitable electronic processing components. The memory 306 may include any of RAM, NVRAM, ROM, Flash Memory, hard disk storage, or the like. The processor 304 is structured to execute instructions stored in the memory 306 that cause the processor 304 to control the operation of the filter authentication system 122. In some arrangements, the memory 306 may also include one or more storage devices (e.g., hard drives, flash drives, computer readable media, etc.) either local or remote from the filter authentication system 122. The memory 306 can be configured to store look up tables, algorithms, and/or instructions. Such algorithms can include, for example, filter tag verification algorithms.

The filter authentication system 122 includes a network interface 308, a filter verification circuit 310, and a filter element database 312. The network interface 308 is structured to facilitate data communication with other devices (e.g., the FMS module 114, the technician device 118, etc.) via the network 124. The filter verification circuit 310 is structured to decrypt and/or decode the information received from the tag 112 (e.g., as received via the FMS module 114 and/or the technician device 118). The decrypted and/or decoded information is then used to verify that the filter element 104 installed in the filtration system 102 is genuine and authorized (e.g., as described in further detail below with respect to FIG. 6). The filter authentication system 122 includes a filter element database 312. In some arrangements, the filter element database 312 is part of the memory 306. The filter element database 312 stores verified filter information that is used by the filter verification circuit 310 to determine whether the filter element 104 installed in the filtration system 102 is genuine and authorized. In some arrangements, the filter element database 312 also includes historic filter usage information (e.g., a record of when specific filter elements were installed in a given filtration system, a record of when non-genuine/non-authorized filter elements were installed in a given filtration system), which may be used to assist with warranty claims involving the system 100.

Figure 4A:
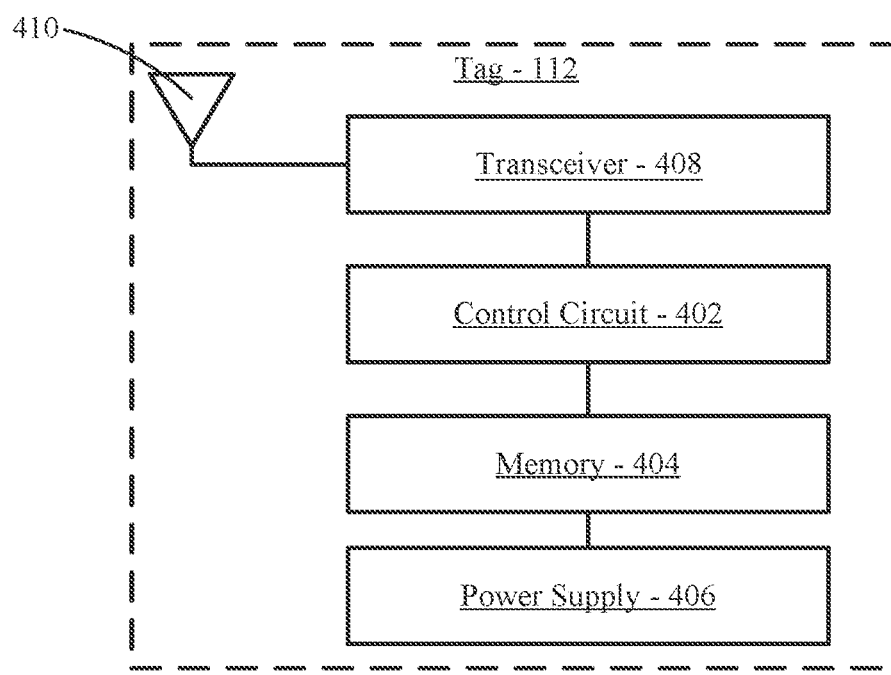
FIG. 4A shows a block diagram of a tag associated with a filter element according to an example embodiment.

Referring to FIG. 4A, a block diagram of the tag 112 is shown according to an example embodiment. The tag 112 of FIG. 4A is an RFID tag. The tag 112 may be an active, semi-active, or passive RFID tag. In some arrangements, the RFID tag 112 may be a cryptographic or holographic RFID tag. Accordingly, the tag 112 includes a control circuit 402, memory 404, a power supply 406, a transceiver 408, and an antenna 410. The control circuit 402 is structured to generally control the operation of the tag 112. When the tag 112 is brought into range of a reader (e.g., tag reader 116), the tag 112 wirelessly communicates a data packet stored in the memory 404 to the reader via the antenna 410 and the transceiver 408. In some arrangements, the tag 112 includes a power supply 406, such as a battery or a capacitor. In other arrangements, the tag 112 receives operating power wirelessly from the reader via the antenna 410.

The memory 404 is structured to store filter element 104 identification information that uniquely identifies a given filter element 104. Accordingly, the memory 404 may be programmed by the manufacturer of the filter element 104 at the time of manufacturing the filter element 1-4 (e.g., as described below with respect to FIG. 5). In some arrangements, the identification information is a string of digits, symbols and numbers that form a unique identification number of the filter element 104. The unique identification number may be a serial number or another string formed by an algorithm or a plurality of algorithms (e.g., a different algorithm for different parts of a given code) associated with the manufacturer of the filter element 104. The unique identification number of the filter element 104 may include, for example, any combination of a place of manufacture, a date of manufacture, a time of manufacture, a model number, an application of the filter element 104 (e.g., air, fuel, water, lubricant, etc.), and the like.

Figure 4B:
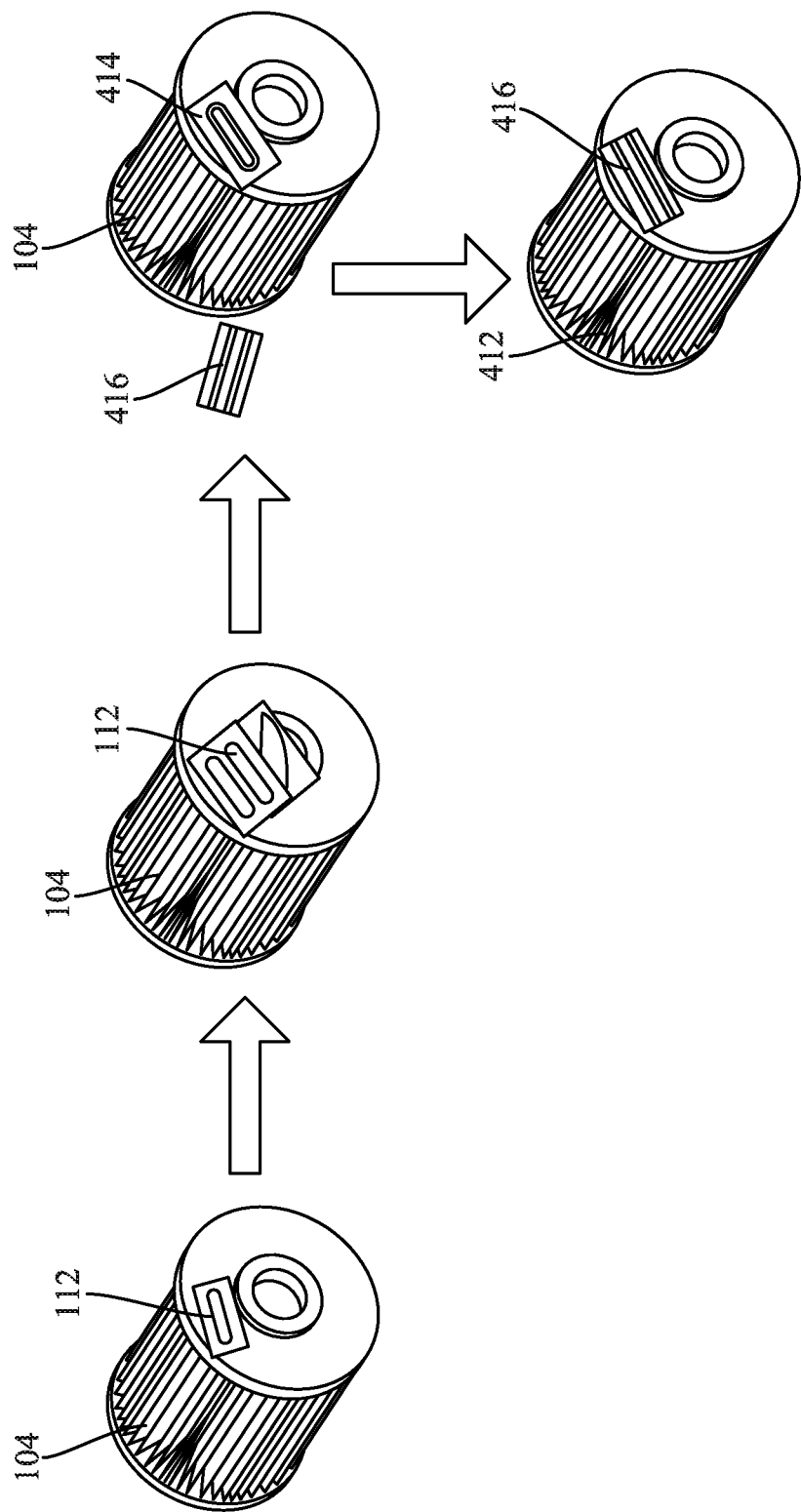
FIG. 4B shows a step-by-step overview of a filter element tag self-destructing according to an example embodiment.

In some arrangements, the tag 112 is constructed in a manner that prohibits removal and replacement of the tag 112 (e.g., from a first filter element to a second filter element) to prevent reuse or over usage of the tag 112. This may be achieved through the use of a holographic RFID tag that is self-destructive if the tag 112 is removed from the filter element 104. For example, the components of the tag 112 may be placed across different physical layers of the media bearing the tag such that if the tag is removed, the antenna 410 is separated from the rest of the tag 112 thereby rendering the tag 112 inoperable. This concept is demonstrated in FIG. 4B, which shows the stages of attempted moving of the tag 112 from the authorized filter element 104 to a non-authorized filter element 412. As shown in the progression of FIG. 4B, if an individual attempts to remove the tag 112 from the filter element 104, the tag 112 splits into a first part 414 that remains on the filter element 104, and a second part 416 that the individual can stick to the non-authorized filter element 412. However, because the first part 414 contains the antenna 410, the second part 416 when placed on the non-authorized filter element 412 does not function.

As described above with respect to FIGS. 4A and 4B, the tag 112 is an RFID tag. In alternative arrangements, the tag 112 provides information to the FMS module 114 and/or the technician device 118 via a visible printed code that contains the filter element information or a reference to the filter element information that is remotely stored (e.g., via a barcode, a two-dimensional barcode, a QR code, etc.). The visible printed code may, for example, be scanned with a camera of the technician device 118. In some arrangements, the visible printed code replaces the RFID tag. In other arrangements, an outer surface of the RFID tag includes the visible printed code. The tag 112 may be embedded in a component of the filter element 104 (e.g., embedded in an endcap or frame member), adhered to a component of the filter element 104, printed on a component of the filter element, thermally attached to a component of the filter element, or the like.

Figure 5:
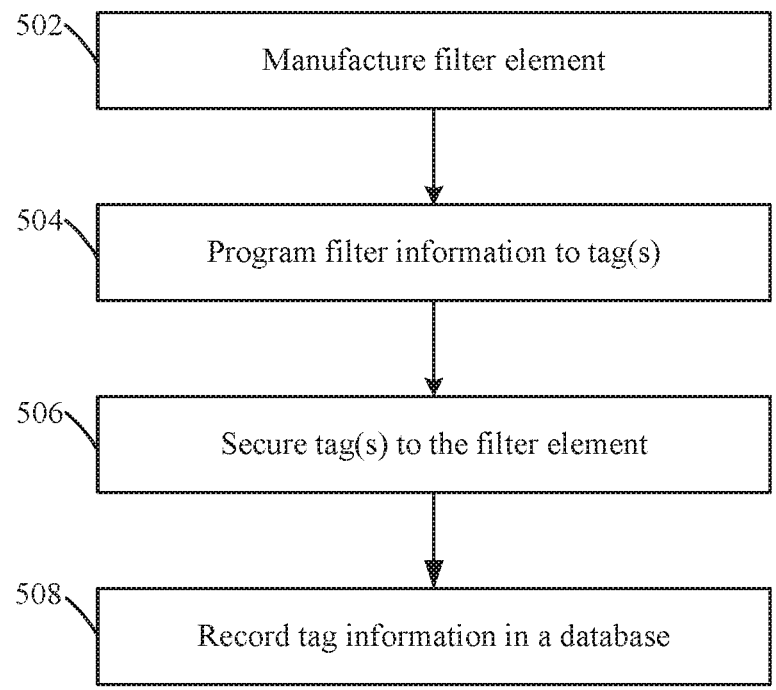
FIG. 5 shows a flow diagram of a method of manufacturing an authorized filter element according to an example embodiment.

Referring to FIG. 5, a flow diagram of a method 500 of manufacturing an authorized filter element (e.g., the filter element 104) is shown according to an example embodiment. The method 500 is performed by a manufacturer that is authorized to produce filter elements for the filtration system 102.

The method 500 begins when the filter element 104 is manufactured at 502. At least one tag 112 is programmed at 504. The tag 112 is programmed with unique information that identifies the manufactured filter element 104. The tag 112 may be an RFID tag, a tag having a visible code (e.g., a barcode, a two-dimensional barcode, a QR code, etc.), or a combination thereof. In some arrangements, multiple tags 112 are created that are associated with the filter element 104. For example, a first tag 112 may be created for the filter element 104, while a second tag 112 may be created for the filter element's packaging. In creating the tag 112, the manufacturer generates a unique identification number associated with the filter element. In arrangements where the tag 112 has memory (e.g., as in an RFID tag), the memory is programmed with the unique identification number. In arrangements where the tag 112 has a visible code, the unique identification number is formatted according to the visible code. In either arrangement, the unique identification number may be encrypted with a private key associated with the manufacturer.

The at least one tag 112 is secured to the filter element at 506. The tag 112 may be secured to the filter element via an adhesive. In arrangements where multiple tags 112 are associated with the filter element, the other tags are secured at other locations on the filter element 104 or the packaging associated with the filter element 104 (e.g., to the outside of the box housing the filter element 104 during shipment).

The tag information is recorded in a database (e.g., the filter element database 312) at 508. The tag information, including the unique identification number, is stored in the database for later cross-referencing and verification purposes. In some arrangements, an encryption key used to decode the encrypted data stored in the tag 112 is also stored in the database.

Figure 6:
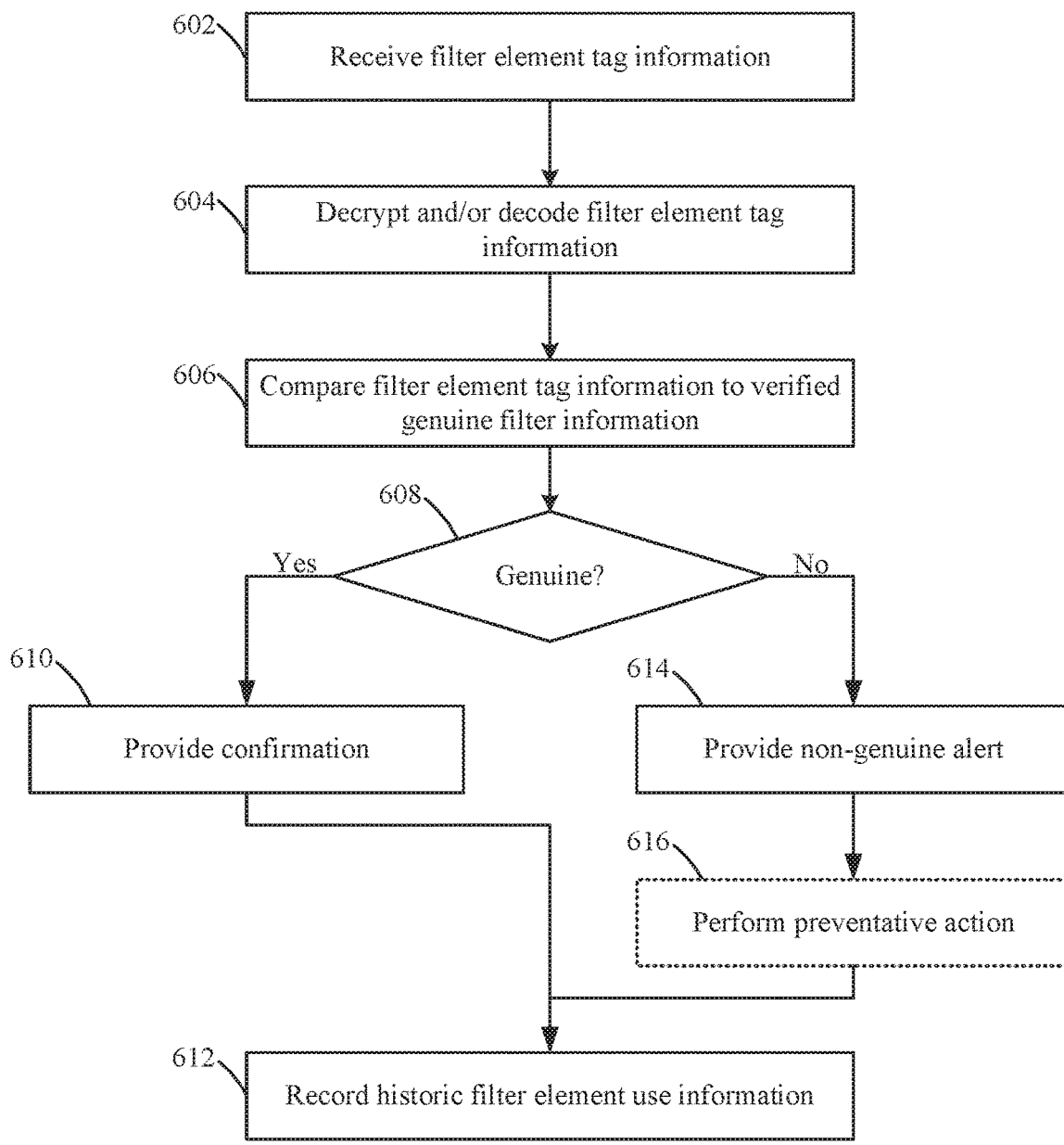
FIG. 6 shows a flow diagram of a method of verifying a filter element as being authentic or genuine according to an example embodiment.

Referring to FIG. 6, a flow diagram of a method 600 of verifying a filter element as being authentic or genuine is shown according to an example embodiment. In some arrangements, the method 600 is performed at every activation of the filtration system 102 (e.g., at every key-on situation for an internal combustion engine). In some arrangements, the method 600 is performed by the filter authentication system 122. In other arrangements, the method 600 is performed by the FMS module 114. In further arrangements, the method 600 is performed by the technician device 118. For ease of discussion, the following discussion of the method 600 is provided from the perspective of the filter authentication system 122.

The method 600 begins when filter element tag information is received at 602. The filter authentication system 122 receives information gathered from the tag 112 from either the FMS module 114 or the technician device 118 via the network 124. In arrangements where the filter element tag information is received from the FMS module 114, the filter element 104 is installed in the filtration system 102 prior to receiving the filter element tag information at 602. In arrangements where the filter element tag information is received from the technician device 118, the filter element tag information may be received prior to the filter element 104 being installed in the filtration system 102 (e.g., by the technician scanning the box the filter element 104 was packaged in or the tag 112 on the filter element 104 prior to installing the filter element 102 in the filtration system 104) or after the filter element 104 is installed in the filtration system 102. The filter element tag information relates to identification information that uniquely identifies the filter element 104 installed in the filtration system 102 (e.g., a unique identification number associated with the filter element 104). In some arrangements, the filter element tag information is encrypted. The filter element tag information is decrypted and/or decoded at 604. In arrangements where the received filter element tag information is encrypted, the filter element tag information is decrypted (e.g., with an encryption key provided by the manufacturer of the filter element 104). In some arrangements, the filter element tag information is received along with system 100 information, such as equipment type, vehicle type, model numbers, internal combustion engine information, filter life span, miles of usage, filter restriction, geographical information of the system, and the like.

The filter element tag information is compared to verified genuine filter element information at 606. The filter authentication system 122 compares the filter element tag information with verified genuine filter element information stored in the filter element database 312. The verified genuine filter element information may relate to a filter identification number or an algorithm that verifies the received filter element tag information. The algorithm may include comparing a number of bits contained in the received filter element identification code, performing mathematical equations on the received filter element identification code, and the like. Based on the comparison at 606, the filter authentication system 122 determines whether the filter element installed in the filtration system is genuine at 608. In some arrangements, a filter element 104 may be determined to be "non-genuine" if the filter element 104 has been used in multiple different filtration systems 102 thereby preventing reuse of an originally genuine filter element 104.

If the filter element is determined to be genuine, a confirmation is provided at 610. The filter authentication system 122 can transmit a confirmation to the FMS module 114 and/or to the technician device 118 to alert the operator of the system 100 (and/or the technician installing the filter element 104) that the filter element is genuine.

If the filter element is not determined to be genuine, a non-genuine alert is provided at 614. The filter authentication system 122 can transmit a non-genuine alert to the FMS module 114 and/or to the technician device 118 to alert the operator of the system 100 (and/or the technician installing the filter element 104) that the filter element 104 is not genuine. In arrangements where the alert is transmitted to the FMS module 114, the FMS module 114 can transmit the received non-genuine alert to the engine control module 120, which can in turn trigger a warning to an operator of the system 100 (e.g., a dashboard light, an alarm, etc.). In some arrangements, preventative action is performed at 616. The preventative action helps reduce the risk of damage to the downstream component 106 (e.g., to the internal combustion engine). The filter authentication system 122 can transmit instructions to the FMS module 114 to activate the preventative action. The preventative action may be to prevent the component 106 from activating (e.g., prevent the internal combustion engine from turning on), shut the component 106 down (e.g., turn the internal combustion engine off), restrict the operation of the component 106 (e.g., derate the internal combustion engine), or the like.

Historic filter element use information is recorded at 612. The filter authentication system 122 records information concerning the installed filter element 104 in the filter element database 312. The information concerning the installed filter element 104 is associated with the filtration system 102. For example, the database may be updated to indicate the date that the filter element 104 was installed and whether the filter element 104 is genuine. The information in the filter element database 312 may be used, for example, in assessing future warranty claims relating to the filtration system 102 and/or to the component 106.

In some arrangements, the method 600 is repeated for each tag 112 scanned that is associated with the filter element 104. For example, in some arrangements, the filter authentications system 122 receives information concerning two tags 112 associated with the filter element 104: a first tag 112 scanned by the technician device 118, and a second tag 112 scanned by FMS module 114 via the tag reader 116. The first tag 112 may be positioned on the packaging associated with the filter element 104, while the second tag 112 may be affixed to the filter element 104. In such arrangements, steps 602-606 may be performed twice in parallel before determining whether the filter element 104 is genuine. If at least one of the tags 112 proves to be inconsistent with the verified tag information, the filter element 104 may be determined to be non-genuine at 608. Accordingly, in such arrangements, the filter element 104 is authenticated through a two-factor authentication process.

Although described as being performed by the filter authentication system 122, it should be understood that the FMS module 114 can also perform the method 600 in the same manner as described above. In such arrangements, the FMS module receives the filter element tag information from the tag reader 116 at 602. The remaining steps of the method 600 are substantially the same as described from the perspective of the filter authentication system 122.

Although described as being performed by the filter authentication system 122, it should be understood that the technician device 118 can also perform the method 600 in the same manner as described above. In such arrangements, the technician device 118 receives the filter element tag information by scanning the tag 112 (e.g., via an RFID antenna, via a camera, via a barcode scanner, etc.) at 602. The remaining steps of the method 600 are substantially the same as described from the perspective of the filter authentication system 122.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Some of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor of the FMS module 114 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer, partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving, by a remote authentication system from a filter monitoring system module onboard a vehicle via a network interface of the remote authentication system, a first set of filter element tag information from a first tag associated with a filter element installed in a filtration system;
   receiving, by the remote authentication system via the network interface, a second set of filter element tag information from a second tag associated with the filter element;
   comparing, by the remote authentication system, both the first set of filter element tag information and the second set of filter element tag information with verified genuine filter element information to determine whether the filter element installed in the filtration system is a genuine filter element;
   in response to determining, by the remote authentication system, that both the first set of filter element tag information and the second set of filter element tag information are consistent with the verified genuine filter element information, transmitting, via the network interface, a confirmation message; and
   in response to determining, by the remote authentication system, that at least one of the first set of filter element tag information or the second set of filter element tag information is inconsistent with the verified genuine filter element information, transmitting, via the network interface, a non-genuine alert,
   wherein receiving the first set of filter element tag information and the second set of filter element tag information comprises:
      receiving the first set of filter element tag information from a tag reader of the filter monitoring system module; and
      receiving, via the network interface, the second set of filter element tag information from a technician computing device that is remote from the vehicle.

2. The method of claim 1, further comprising recording, by the remote authentication system, the first set of filter element tag information in a filter element database.

3. The method of claim 1, wherein the first tag is a radio frequency identification tag or a barcode tag.

4. The method of claim 3, wherein the first tag is self-destructive such that the first tag cannot be removed from the filter element without damaging the ability of the first tag to transmit the first set of filter element tag information.

5. The method of claim 1, wherein transmitting the confirmation message comprises transmitting, via the network interface, the confirmation message to the filter monitoring system module.

6. The method of claim 1, wherein receiving the second set of filter element tag information comprises receiving the second set of filter element tag information from the technician computing device via the Internet.

7. The method of claim 1, wherein transmitting the non-genuine alert comprises transmitting, via the network interface, the non-genuine alert to the filter monitoring system module.

8. The method of claim 1, further comprising, in response to determining that at least one of the first set of filter element tag information or the second set of filter element tag information is inconsistent with the verified genuine filter element information, transmitting, by the remote authentication system, an instruction to perform a preventative action to the filter monitoring system module.

9. The method of claim 8, wherein the instruction to perform the preventative action causes an internal combustion engine associated with the filtration system to turn off, not start, record a fault code, or derate.

10. The method of claim 1, further comprising establishing, using the network interface, a datalink with the filter monitoring system module over a telecommunications network.

11. The method of claim 1, wherein the remote authentication system is remote and physically separate from the filter monitoring system module and the filtration system, and wherein the filter monitoring system module and the filtration system are disposed on the vehicle.

12. A filter authentication system comprising:
   a memory structured to store instructions;
   a processor structured to execute the instructions stored in the memory;
   a storage device structured to store a filter element database; and
   a network interface structured to communicate with a filter monitoring system module onboard a vehicle via a telecommunications network;
   wherein the stored instructions, when executed by the processor, cause the filter authentication system to perform operations comprising:

receiving, from the filter monitoring system module, via the network interface, a first set of filter element tag information from a first tag associated with a filter element installed in a filtration system;

receiving, via the network interface, a second set of filter element tag information from a second tag associated with the filter element;

comparing both the first set of filter element tag information and the second set of filter element tag information with verified genuine filter element information stored in the filter element database to determine whether the filter element installed in the filtration system is a genuine filter element;

in response to determining that both the first set of filter element tag information and the second set of filter element tag information are consistent with the verified genuine filter element information, transmitting, via the network interface, a confirmation message; and in response to determining that at least one of the first set of filter element tag information or the second set of filter element tag information is inconsistent with the verified genuine filter element information, transmitting, via the network interface, a non-genuine alert, wherein receiving the first set of filter element tag information and the second set of filter element tag information comprises:

receiving the first set of filter element tag information from a tag reader of the filter monitoring system module, and receiving the second set of filter element tag information from a technician computing device that is remote from the vehicle.

13. The filter authentication system of claim 12, wherein the stored instructions further cause the filter authentication system to perform operations comprising recording, by the filter authentication system, the first set of filter element tag information in the filter element database.

14. The filter authentication system of claim 12, further comprising:

a filter verification circuit structured to decrypt the received first set of filter element tag information received from the first tag and use the decrypted filter element tag information to verify the filter element by comparing the decrypted filter element tag information with the verified genuine filter element information.

15. The filter authentication system of claim 12, wherein transmitting the non-genuine alert comprises transmitting, via the network interface, the non-genuine alert to the filter monitoring system module.

16. The filter authentication system of claim 12, wherein the stored instructions further cause the filter authentication system to perform operations comprising transmitting, to the filter monitoring system module via the network interface, an instruction to perform a preventative action, in response to determining that at least one of the first set of filter element tag information or the second set of filter element tag information is inconsistent with the verified genuine filter element tag information.

17. The filter authentication system of claim 16, wherein the instruction to perform the preventative action causes an internal combustion engine associated with the filtration system to turn off, not start, record a fault code, or derate.

18. The filter authentication system of claim 12, wherein transmitting the confirmation message comprises transmitting, via the network interface, the confirmation message to the filter monitoring system module.

* * * * *